(12) United States Patent
Magoon et al.

(10) Patent No.: US 12,292,867 B2
(45) Date of Patent: May 6, 2025

(54) EFFICIENT DATA SCRAPING AND DEDUPLICATION SYSTEM FOR REGISTERED SEX OFFENDER QUERIES

(71) Applicant: KnowPeds, LLC, McLean, VA (US)

(72) Inventors: Namita Magoon, Dulles, VA (US); Sanjay Magoon, Dulles, VA (US)

(73) Assignee: KnowPeds, LLC, McLean, VA (US)

( * ) Notice: Subject to any disclaimer, the term of this patent is extended or adjusted under 35 U.S.C. 154(b) by 0 days.

(21) Appl. No.: 18/490,676

(22) Filed: Oct. 19, 2023

(65) Prior Publication Data
US 2024/0273073 A1  Aug. 15, 2024

Related U.S. Application Data

(63) Continuation of application No. 17/538,828, filed on Nov. 30, 2021, now Pat. No. 11,829,339, which is a continuation of application No. 16/441,515, filed on Jun. 14, 2019, now Pat. No. 11,216,426.

(60) Provisional application No. 62/815,952, filed on Mar. 8, 2019, provisional application No. 62/685,191, filed on Jun. 14, 2018.

(51) Int. Cl.
| | | |
|---|---|---|
| *G06F 17/00* | (2019.01) | |
| *G06F 16/215* | (2019.01) | |
| *G06F 16/9535* | (2019.01) | |
| *G06F 16/9538* | (2019.01) | |
| *G06F 16/958* | (2019.01) | |
| *G06Q 50/26* | (2012.01) | |

(52) U.S. Cl.
CPC ........ *G06F 16/215* (2019.01); *G06F 16/9535* (2019.01); *G06F 16/9538* (2019.01); *G06F 16/986* (2019.01); *G06Q 50/265* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 9,495,473 B2 | 11/2016 | Gardner | |
| 9,721,296 B1* | 8/2017 | Chrapko | G06Q 40/03 |
| 10,127,210 B1* | 11/2018 | Karppanen | G06F 40/103 |
| 11,165,782 B1 | 11/2021 | Tayloe | |
| 2005/0166138 A1* | 7/2005 | Kundu | G06F 16/958 |
| | | | 707/E17.116 |

(Continued)

*Primary Examiner* — Hung D Le
(74) *Attorney, Agent, or Firm* — Knobbe, Martens, Olson & Bear, LLP

(57) ABSTRACT

An improved query system in which registered sex offender information published in state and territory databases is obtained using an improved data scraper, merged, cleaned, and/or enriched to remove inaccuracies is described herein. Users can then perform a single search or multiple searches simultaneously (e.g., perform batch searches) and view the results in a single content page. The improved query system can use the merged and/or cleaned data to generate a more limited set of search results, reducing the amount of mismatched or inaccurate information that a user may have to navigate through. Thus, users can perform one or more searches and view accurate search results without having to navigate through many different windows or content pages or perform additional navigational steps to identify relevant information.

20 Claims, 10 Drawing Sheets

(56) References Cited

U.S. PATENT DOCUMENTS

| | | | |
|---|---|---|---|
| 2007/0250711 A1* | 10/2007 | Storey | H04W 12/06 |
| | | | 713/168 |
| 2008/0036612 A1 | 2/2008 | Koslow et al. | |
| 2008/0218335 A1 | 9/2008 | Attar | |
| 2010/0145902 A1* | 6/2010 | Boyan | G06F 16/958 |
| | | | 715/810 |
| 2012/0017165 A1 | 1/2012 | Gardner | |
| 2014/0337707 A1* | 11/2014 | Choi | G06F 16/986 |
| | | | 715/234 |
| 2015/0059003 A1 | 2/2015 | Bouse | |
| 2015/0082276 A1* | 3/2015 | Balachandran | G06F 11/3604 |
| | | | 717/112 |
| 2016/0375365 A1* | 12/2016 | Thompson | A63F 13/537 |
| | | | 463/9 |
| 2017/0046787 A1* | 2/2017 | Bothwell | G06Q 40/08 |
| 2018/0191764 A1* | 7/2018 | Chawla | G06F 16/951 |
| 2018/0349679 A1 | 12/2018 | Rozploch | |
| 2019/0034441 A1 | 1/2019 | Capon | |
| 2019/0130719 A1* | 5/2019 | D'Amico | G06Q 50/265 |
| 2020/0208857 A1 | 7/2020 | Nayak | |

\* cited by examiner

EFFICIENT DATA SCRAPING AND DEDUPLICATION SYSTEM FOR REGISTERED SEX OFFENDER QUERIES

CROSS-REFERENCE TO RELATED APPLICATIONS

This application is a continuation of U.S. patent application Ser. No. 17/538,828, entitled "EFFICIENT DATA SCRAPING AND DEDUPLICATION SYSTEM FOR REGISTERED SEX OFFENDER QUERIES" and filed on Nov. 30, 2021, which is a continuation of U.S. patent application Ser. No. 16/441,515, entitled "EFFICIENT DATA SCRAPING AND DEDUPLICATION SYSTEM FOR REGISTERED SEX OFFENDER QUERIES" and filed on Jun. 14, 2019, which claims priority under 35 U.S.C. § 119(e) to U.S. Provisional Application No. 62/685,191, entitled "PROTECTING OUR YOUTH FROM SEXUAL OFFENSES" and filed on Jun. 14, 2018, and U.S. Provisional Application No. 62/815,952, entitled "EFFICIENT DATA SCRAPING AND DEDUPLICATION SYSTEM FOR REGISTERED SEX OFFENDER QUERIES" and filed on Mar. 8, 2019, which are hereby incorporated by reference herein in their entireties.

BACKGROUND

States and territories in the United States are required to publish information about registered sex offenders (RSOs). Often, states and territories publish this information over a publicly-accessible network (e.g., the Internet). Each state and territory, however, maintains an independent database of information and the databases are designed such that efficiently accessing the information can be difficult for a user. As a result, a user may experience noticeable latency when performing searches, and a user may have to navigate through many different windows or content pages (e.g., network pages, web pages, etc.) or perform additional navigational steps (e.g., scrolling, clicking, etc.) in order to identify relevant information. In addition, even if a user is able to identify relevant information, the states and territories do a poor job of maintaining the information that is published. Thus, users frequently identify information that is actually inaccurate and/or misleading.

SUMMARY

Described herein is an improved query system in which information published in the state and territory databases is obtained, merged, and/or cleaned to remove inaccuracies. Users can then perform a single search or multiple searches simultaneously (e.g., perform batch searches) and view the results in a single content page. The improved query system can use the merged and/or cleaned data to generate a more limited set of search results, reducing the amount of mismatched or inaccurate information that a user may have to navigate through. Thus, users can perform one or more searches and view accurate search results without having to navigate through many different windows or content pages or perform additional navigational steps (e.g., scrolling, clicking, etc.) to identify relevant information. This can be especially useful for users performing a search via a mobile device, in which screen space is limited and providing an excessive number of search results can result in users closing a browser window after a brief amount of scrolling and prevent users from identifying relevant information.

One aspect of the disclosure provides a system comprising a processed data store configured to store data records corresponding to a plurality of registered sex offenders. The system further comprises a computing system comprising a processor and computer-executable instructions, wherein the computer-executable instructions, when executed, cause the computing system to: obtain first content page source code from a first external data source; obtain second content page source code from a second external data source; generate a first document object model (DOM) tree using the first content page source code; generate a second DOM tree using the second content page source code; traverse the first DOM tree using a first path to identify first data, wherein the first path is selected based on a layout of content pages served by the first external data source; traverse the second DOM tree using a second path to identify second data, wherein the second path is selected based on a layout of content pages served by the second external data source; determine that the first data and the second data correspond to a first registered sex offender in the plurality of registered sex offenders; generate a first data record in which the first data is merged with the second data; and store the first data record in the processed data store.

The system of the preceding paragraph can include any sub-combination of the following features: where the computer-executable instructions, when executed, further cause the computing system to, prior to traversing the first DOM tree: traverse one or more paths through a third DOM tree generated based on third content page source code obtained from the first external data source, determine that a third path through the third DOM tree does not result in identification of third data, determine that the first path through the third DOM tree results in identification of the third data, and set a data scraping path as the first path such that DOM trees generated based on content page source code obtained from the first external data source are traversed using the data scraping path; where the first path and the second path are different paths; where the first data comprises a first name, a middle initial, and a last name, wherein the second data comprises a first initial, a middle name, and the last name, and wherein the first data record comprises the first name, the middle name, and the last name; and where the computer-executable instructions, when executed, further cause the computing system to: process a search query received from a user device, determine a plurality of identities that correspond with the search query, retrieve, from the processed data store, one or more of the data records that correspond with at least one of the plurality of identities, generate user interface data that, when processed by the user device, causes the user device to render and display a user interface depicting information comprised within the one or more data records, and transmit the user interface data to the user device.

Another aspect of the disclosure provides a computer-implemented method comprising: obtaining first content page source code from a first external data source; obtaining second content page source code from a second external data source; generating a first document object model (DOM) tree using the first content page source code; generating a second DOM tree using the second content page source code; traversing the first DOM tree using a first path to identify first data, wherein the first path is selected based on a layout of content pages served by the first external data source; traversing the second DOM tree using a second path to identify second data, wherein the second path is selected based on a layout of content pages served by the second external data source; determining that the first data and the second data correspond to a same user; generating a first data record in which the first data is merged with the second data; and storing the first data record.

The computer-implemented method of the preceding paragraph can include any sub-combination of the following features: where the computer-implemented method further comprises, prior to traversing the first DOM tree: traversing one or more paths through a third DOM tree generated based on third content page source code obtained from the first external data source, determining that a third path through the third DOM tree does not result in identification of third data, determining that the first path through the third DOM tree results in identification of the third data, and setting a data scraping path as the first path such that DOM trees generated based on content page source code obtained from the first external data source are traversed using the data scraping path; where the first path and the second path are different paths; where the first data comprises a first name, a middle initial, and a last name, wherein the second data comprises a first initial, a middle name, and the last name, and wherein the first data record comprises the first name, the middle name, and the last name; where the computer-implemented method further comprises: receiving a search query from a user device, determining a plurality of identities that correspond with the search query, retrieving one or more data records that correspond with at least one of the plurality of identities, generating user interface data that, when processed by the user device, causes the user device to render and display a user interface depicting information comprised within the one or more data records, and transmitting the user interface data to the user device; where the computer-implemented method further comprises: receiving a batch search query from a user device, wherein the batch search query comprises a plurality of search queries, determining, for each search query in the plurality of search queries, a plurality of identities that correspond with the respective search query, retrieving, for each search query in the plurality of search queries, one or more data records that correspond with at least one of the plurality of identities, generating user interface data that, when processed by the user device, causes the user device to render and display a user interface depicting information comprised within the one or more data records retrieved for each search query in the plurality of search queries, and transmitting the user interface data to the user device; where the computer-implemented method further comprises: receiving a search query, wherein the search query comprises a captured image, retrieving, from one or more data records, a plurality of images corresponding to a plurality of users, comparing the captured image with the plurality of images, determining that the capture image corresponds with a first image in the plurality of images based on the comparison, obtaining user data from a data record in the one or more data records from which the first image is retrieved, generating user interface data that, when processed by the user device, causes the user device to render and display a user interface depicting the user data, and transmitting the user interface data to a user device; where the search query is received from a video system located at one of a building, a common carrier, or a public place; where the search query is received automatically in response to a detection of a person in the captured image; and where the computer-implemented method further comprises: receiving a search query, wherein the search query comprises a captured image, retrieving, from one or more data records, a plurality of images corresponding to a plurality of users, comparing the captured image with the plurality of images, determining that the capture image corresponds with a first image in the plurality of images based on the comparison, obtaining user data from a data record in the one or more data records from which the first image is retrieved, generating an alert indicating that the captured image corresponds with a registered sex offender, wherein the alert comprises the user data, and transmitting the alert to a user device.

Another aspect of the disclosure provides non-transitory, computer-readable storage media comprising computer-executable instructions for obtaining registered sex offender data, wherein the computer-executable instructions, when executed by a computer system, cause the computer system to: obtain first content page source code from a first external data source; generate a first document object model (DOM) tree using the first content page source code; traverse the first DOM tree using a first path to identify first data, wherein the first path is selected based on a layout of content pages served by the first external data source; generate a first data record that comprises the first data; and store the first data record.

The non-transitory, computer-readable storage media of the preceding paragraph can include any sub-combination of the following features: where the computer-executable instructions, when executed, further cause the computer system to, prior to traversing the first DOM tree: traverse one or more paths through a second DOM tree generated based on second content page source code obtained from the first external data source, determine that a second path through the second DOM tree does not result in identification of second data, determine that the first path through the second DOM tree results in identification of the second data, and set a data scraping path as the first path such that DOM trees generated based on content page source code obtained from the first external data source are traversed using the data scraping path; where the computer-executable instructions, when executed, further cause the computer system to: receive a search query from a user device, determine a plurality of identities that correspond with the search query, retrieve one or more data records that correspond with at least one of the plurality of identities, generate user interface data that, when processed by the user device, causes the user device to render and display a user interface depicting information comprised within the one or more data records, and transmit the user interface data to the user device; where the computer-executable instructions, when executed, further cause the computer system to: receive a batch search query from a user device, wherein the batch search query comprises a plurality of search queries, determine, for each search query in the plurality of search queries, a plurality of identities that correspond with the respective search query, retrieve, for each search query in the plurality of search queries, one or more data records that correspond with at least one of the plurality of identities, generate user interface data that, when processed by the user device, causes the user device to render and display a user interface depicting information comprised within the one or more data records retrieved for each search query in the plurality of search queries, and transmit the user interface data to the user device; and where the computer-executable instructions, when executed, further cause the computer system to: receive a search query, wherein the search query comprises a captured image, retrieve, from one or more data records, a plurality of images corresponding to a plurality of users, compare the captured image with the plurality of images, determine that the capture image corresponds with a first image in the plurality of images based on the comparison, obtain user data from a data record in the one or more data records from which the first image is retrieved, generate user interface data that, when processed by the user device, causes the user device to render and display a user interface depicting the user data, and transmit the user interface data to a user device.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
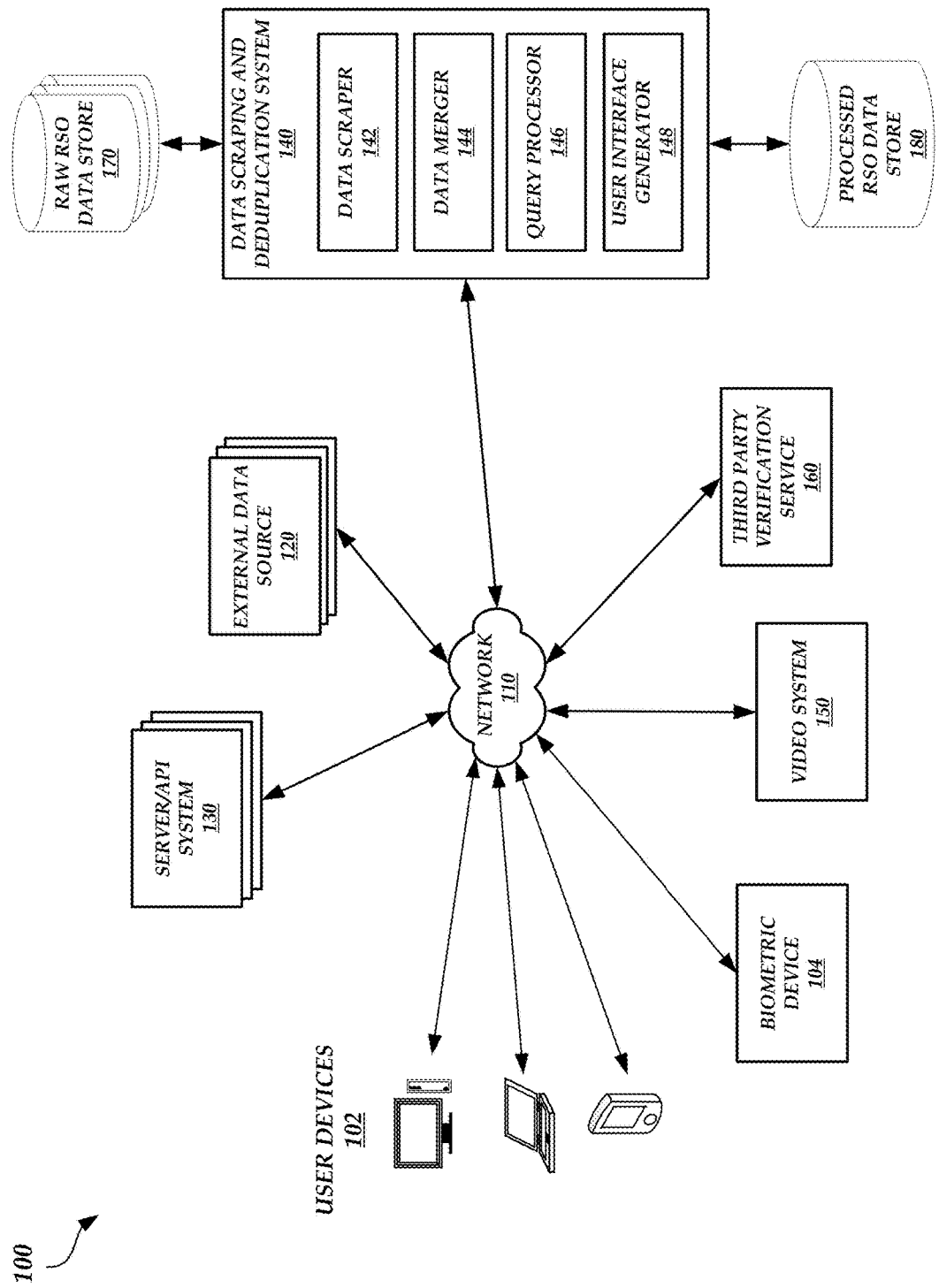
FIG. 1 is a block diagram of an illustrative operating environment in which a data scraping and deduplication system obtains, merges, indexes, and/or cleans RSO data and provides a search query engine that allows users to perform one or more searches, in one embodiment.

As described above, a user may experience noticeable latency when performing searches on state and/or territory RSO databases, and a user may have to navigate through many different windows or content pages (e.g., network pages, web pages, etc.) or perform additional navigational steps (e.g., scrolling, clicking, etc.) in order to identify relevant information. For example, the publicly-accessible state and territory databases rely on a "simple search" technology in which hundreds of possible matches are returned for a single query. Many of the search results are inaccurate or actual mismatches, and so a user may have to navigate through many different windows or content pages or perform additional navigational steps to sort through the mismatches and identify relevant information. In some cases, the publicly-accessible state and territory databases can become non-responsive due to a high load, network connectivity issues, hardware failures, and/or the like, so no search results are even received. In addition, even if a user is able to identify relevant information, the states and territories do a poor job of maintaining the information that is published. Thus, users frequently identify information that is actually inaccurate and/or misleading.

One possibility for overcoming the navigation issue described above is to provide a national database in which information managed by the states and territories is combined. The United States Department of Justice operates a publicly-accessible page that appears to be a combined database, and is referred to as The National Sex Offender Public Website (NSOPW). The NSOPW, however, is not a national database. Rather, the NSOPW provides users the ability to perform a search, and the NSOPW then re-directs the search to one of the publicly-accessible state or territory databases.

Furthermore, none of the state or territory databases, nor the NSOPW, allow a user to submit multiple searches simultaneously. This lack of support for multiple, parallel searches can significantly increase the search latency and result in the user navigating between multiple windows and pages as a user may have to manually enter one search in one window, enter another search in another window, and so on.

Accordingly, described herein is an improved query system in which information published in the state and territory databases is obtained, merged, and/or cleaned to remove inaccuracies. Users can then perform a single search or multiple searches simultaneously (e.g., perform batch searches) and view the results in a single content page. The improved query system can use the merged and/or cleaned data to generate a more limited set of search results, reducing the amount of mismatched or inaccurate information that a user may have to navigate through. Thus, users can perform one or more searches and view accurate search results without having to navigate through many different windows or content pages or perform additional navigational steps (e.g., scrolling, clicking, etc.) to identify relevant information. This can be especially useful for users performing a search via a mobile device, in which screen space is limited and providing an excessive number of search results can result in users closing a browser window after a brief amount of scrolling and prevent users from identifying relevant information.

The improved query system, also referred to herein as the data scraping and deduplication system, provides additional technical benefits. For example, the improved query system can use network-accessible storage and processing systems (e.g., "cloud" computing) to provide a highly available, highly responsive, and highly reliable interface. For example, the improved query system can use services offered by network-accessible storage and processing systems to launch multiple virtual machine instances and/or store information in multiple geographic regions or availability zones to provide redundant, and therefore available and reliable, functionality. The improved query system can also use the offered services to implement auto-scaling functionality such that additional computing resources (e.g., central processing unit (CPU) power, memory storage, etc.) can be allocated on-demand if the existing computing resources are nearing maximum utilization. The improved query system can also scrape data from the publicly-accessible content pages that display information stored in state and territory databases in order to build a database of merged and/or cleaned RSO data. Traditional data scrappers fail, however, when the servers that serve these publicly-accessible content pages go down (e.g., due to malfunctions, network attacks, regular maintenance, etc.), when these publicly-accessible content pages throw CAPTCHAs, when these publicly-accessible content pages change formatting or content layout, and/or the like. The improved query system uses an improved data scrapper that overcomes these technical deficiencies. Thus, data can be obtained from the states and territories even if the corresponding publicly-accessible content pages become unavailable, throw CAPTCHAs (whenever applicable and allowed), change formatting or content layout, etc. In addition, the improved query system can redirect query instructions to different hardware components than are traditionally used to execute instructions, thereby improving query speeds. These technical benefits provided by the improved query system are described in greater detail below.

The foregoing aspects and many of the attendant advantages of this disclosure, including the above-referenced technical benefits, will become more readily appreciated as the same become better understood by reference to the following detailed description, when taken in conjunction with the accompanying drawings.

Example RSO Query Environment

FIG. 1 is a block diagram of an illustrative operating environment 100 in which a data scraping and deduplication system 140 obtains, merges, indexes, and/or cleans RSO data and provides a search query engine that allows users to perform one or more searches, in one embodiment. The operating environment 100 includes the data scraping and deduplication system 140, end user devices 102, a biometric device 104, one or more external data sources 120, one or more server/application programing interface (API) systems 130, a video system 150, a third party verification service 160, a raw RSO data store 170, and a processed RSO data store 180.

The data scraping and deduplication system 140 may include various modules, components, data stores, and/or the like to obtain, merge, and/or clean RSO data and provide a search query engine that allows users to perform one or more searches of the merged and/or cleaned RSO data. For example, the data scraping and deduplication system 140 includes a data scraper 142, a data merger 144, a query processor 146, and a user interface generator 148.

The data scraper 142 can obtain RSO data (e.g., scrape RSO data) from publicly-accessible content pages published by states and/or territories that depict RSO data (e.g., RSO name, date of birth, gender, race, address, crime(s), status, etc.). For example, each state and/or territory may publish multiple content pages, where each content page corresponds to a particular RSO and depicts data for that RSO. The data scraper 142 can obtain, from an external data source (e.g., a content delivery network (CDN), a website, an rich site summary (RSS) feed, a blog, etc.) 120 via network 110, source code for one or more content pages associated with a particular state or territory. For an individual content page, the data scraper 142 can generate a document object model (DOM) tree, where each node in the DOM tree represents a network or web element (e.g., a markup language tag, such as a hypertext markup language (HTTP) tag, an extensible markup language (XML) tag, etc.) or an object (e.g., text, an image, etc.). Generally, a leaf node in the DOM tree represents an object.

The data scraper 142 can traverse one or more paths in the DOM tree to identify the RSO data. For example, RSO data falls into one of several categories, such as name, date of birth, gender, race, address, crime(s), status, etc. The leaf node of a path in the DOM tree may include text that identifies the category and the RSO data corresponding to the category. As an illustrative embodiment, the leaf node of a path in the DOM tree may include the following text: "Name: John Doe." The data scraper 142 may be configured to identify certain words (e.g., "name," "date of birth" or "DOB," "sex" or "gender," "race," etc.) that identify a category, and associate the text following the identified category with the category. In this manner, the data scraper 142 can identify data associated with the RSO that falls within one or more categories when traversing a DOM tree path.

In some cases, the leaf node of a path in the DOM tree includes an image or a reference to an image, such as a mugshot or profile of the RSO, a feature of the RSO (e.g., a tattoo, etc.). If the leaf node includes a reference to an image (e.g., a uniform resource locator (URL) that links to the image), the data scraper 142 can retrieve the image from an external source (e.g., using the reference or link including the DOM tree). If the leaf node includes the image itself (e.g., because the image is embedded in the content page using a hash), the data scraper 142 can copy the image byte by byte (or bytes by bytes). In some embodiments, the data scraper 142 can hash the image and compare the hash with one or more previous hashes. If the hash matches a previous hash, the data scraper 142 determines that the image has not changed and may not retrieve the image from the external source in situations in which a previously retrieved copy of the image is still stored locally. If the hash does not match a previous hash, the data scraper 142 determines that the image has changed and proceeds as described herein. The process of identifying a category of RSO data and associating text with the identified category and/or retrieving and/or copying an image can be referred to herein as scraping RSO data.

Once the data scraper 142 has obtained the RSO data depicted on a first content page, the data scraper 142 can repeat this process for another content page. The data scraper 142 can repeat this process for any number of content pages published by any number of states or territories. Alternatively or in addition, the data scraper 142 may obtain RSO data from a plurality of content pages simultaneously.

As described herein, the format and/or layout of content pages can change over time and/or the content pages can throw CAPTCHAs before the content page data is viewable. The data scraper 142 is configured to obtain RSO data using the operations described above regardless of whether the format and/or layout of a content page has changed and regardless of whether a content page throws a CAPTCHA (whenever applicable and allowed). For example, certain RSO data may initially be found by traversing one path in the DOM tree. However, after a change to the format or layout of a content page, the RSO data may only be found by traversing another path in the DOM tree. Traditional data scrapers may follow a set path to identify RSO data, which can cause errors when the format or layout of the content page changes. The data scraper 142 can account for these changes by periodically (e.g., once an hour, once a day, once a month, once a year, etc.) running a test routine to identify which path in the DOM tree to traverse to identify a specific category of RSO data. For example, the data scraper 142 may have test data that indicates that a certain category of RSO data (e.g., names) should be present on a content page. The test data may also indicate what the RSO data should be (e.g., "John Doe"). During the test routine, the data scraper 142 can traverse a first path in the DOM tree and determine whether the category of RSO data is present in the leaf node of the first path. The first path may be the path the data scraper 142 has used in the past to identify the same category of RSO data from content pages published by the same state or territory as the content page on which the test routine is being run. If the category of RSO data is not present in the first path, the data scraper 142 can traverse a second path in the DOM tree to determine whether the category of RSO data is present in the leaf node of the second path, and so on. The data scraper 142 can repeat these traversals any number of times until a leaf node that includes the category of RSO data is identified. Once the path with the leaf node that includes the category of RSO data is identified, the data scraper 142 can select the identified path as the path to use going forward when obtaining the category of RSO data from content pages published by the same state or territory as the content page on which the test routine was run.

Content pages published by a particular state or territory often have the same formatting or layout. However, a content page published by one state or territory may have a different layout than a content page published by another state or territory. Thus, the data scraper 142 may have test data for each state or territory, and run separate test routines for each state or territory. As a result, the data scraper 142 may select and traverse different paths for content pages published by different states or territories.

In addition, as described herein, servers operated by the states or territories to serve the publicly-accessible content pages often fail. Typical data scrapers restart the scraping process if content pages become unavailable during the scraping process. This can result in the repetition of operations, reducing the amount of processing power that can be dedicated to other tasks and increasing the data scraping time. The data scraper 142, however, can use pointers to overcome issues that may arise when content pages become unavailable. For example, a state or territory may provide a search results content page on which a plurality of RSOs are briefly identified. Selecting an RSO in the search results content page then may result in the state or territory providing a content page associated with the selected RSO. The data scraper 142 can generate a DOM tree using the source code of the search results content page, such that a first path through the DOM tree results in a leaf node corresponding to one RSO, a second path through the DOM tree results in a leaf node corresponding to a second RSO, and so on. The data scraper 142 can also request a first set of content pages (e.g., one or more content pages) associated with one or more RSOs briefly identified in the search results content page. The data scraper 142 can use a pointer to mark, in the DOM tree for the search results content page, the RSO associated with the last content page that was requested (e.g., the last content page in the first set of content pages). After scraping the requested content pages, the data scraper 142 can request a second set of content pages and move the pointer to mark, in the DOM tree for the search results content page, the RSO associated with the last content page that was requested (e.g., the last content page in the second set of content pages). If the data scraper 142 cannot retrieve the second set of content pages (e.g., because the server hosting and serving the content pages has gone down), the data scraper 142 can pause the scraping process so that the scraping process can be resumed at a later time. For example, the data scraper 142 can periodically ping the server to determine when the server is operational again, and resume the scraping process at that point. The data scraper 142 can use the pointer to identify which content pages have already been scraped so that the scraping of these content pages does not have to be repeated.

As an illustrative example, if the search results content page briefly identifies 20 RSOs, and the data scraper 142 requests content pages for the first 5 RSOs, the data scraper 142 may then use a pointer to mark the DOM tree to indicate that the fifth RSO is associated with the last content page that was requested. For example, the data scraper 142 may modify the leaf node corresponding to the fifth RSO to include the pointer or to otherwise indicate that the leaf node corresponds to a content page that was last retrieved and scraped. After scraping content pages for the first 5 RSOs, the data scraper 142 may attempt to retrieve content pages for the next 5 RSOs. If the attempt to retrieve such content pages fails, the data scraper 142 can pause the scraping process and resume the scraping process at another time. When resuming the scraping process, the data scraper 142 may traverse the DOM tree for the search results content page and determine that a pointer is associated with the fifth RSO. Thus, rather than starting the scraping process by attempting to retrieve the content page for the first RSO, the data scraper 142 may begin the scraping process by attempting to retrieve the content page for the sixth RSO, the seventh RSO, and so on.

Alternatively or in addition, the data scraper 142 may use a library, such as a JavaScript library to traverse the DOM tree and identify desired RSO data. For example, instead of traversing a path in the DOM tree, the data scraper 142 can use a library (e.g., JSOUP, SELENIUM, etc.) to search directly for certain elements in the DOM tree (e.g., like the <text> tag, which may be followed by an RSO name, date of birth, address, gender, race, status, etc.). The use of the library may also reduce the effects of a change in the format or layout of a content page as the data scraper 142 may not rely on any particular DOM tree path traversal. Rather, the data scraper 142 can periodically run test routines to identify which DOM tree elements are associated with specific categories of RSO data. The data scraper 142 can then search directly for these DOM tree elements, ignoring the actual path in which these DOM tree elements fall.

In other embodiments, the data scraper 142 may not request content pages from the external data source 120. Rather, the data scraper 142 may obtain RSO data directly from one or more of the RSO data stores 170. For example, a state or territory may manage an RSO data store 170, and each RSO data store 170 may include RSO data for one or more RSOs. Thus, the data scraper 142 can avoid generating and traversing DOM trees, and simply retrieve the RSO data from an RSO data store 170. The data scraper 142 can retrieve the data in any format, such as a CSV or other type of spreadsheet file.

Once the data scraper 142 has obtained the RSO data (e.g., scraped the RSO data), the data scraper 142 can provide the obtained RSO data to the data merger 144. The data merger 144 may be configured to merge and/or clean the obtained RSO data. For example, the data merger 144 can apply multiple data enrichment strategies when the obtained RSO data is incomplete. For example, the DOB data attribute could be missing or only partially available (e.g., only age or birth year may be available). In those cases, the data merger 144 can collect relevant data from multiple external data sources (e.g., one or more third party verification services 160, websites, blogs, RSS feeds, databases, etc.) and apply sophisticated rules and/or algorithms to identify the RSO, cleanse the data, map the relevant identities, and/or enrich the RSO profile to a higher accuracy. The rules can be configured, customized, and/or continually fine-tuned to improve the accuracy of the RSO data and build a rich profile for the relevant person. In addition, RSO data obtained from a content page associated with one state or territory may correspond to the same RSO as RSO data obtained from a content page associated with another state or territory (e.g., because the obtained RSO data indicates that the first names are identical, the addresses are identical, the date of births are identical, etc.). The RSO data obtained from one state, however, may differ in some respects from RSO data obtained from another state. For example, the RSO data obtained from one state may include an image of the RSO, while the RSO data obtained from another state may not. Thus, the data merger 144 can identify RSO data obtained from different states or territories that correspond to the same RSO (e.g., based on similarities in the RSO data, as described above), and merge the RSO data to form a single data record for the RSO. The merging can include combining information obtained from one state or territory with information obtained from another state or territory to form a more complete data record. By merging (or deduplicating) data, future queries submitted by a user device 102, a biometric device 104, a server/API system 130, and/or video system 150 may be faster because fewer data records may need to be searched by the query processor 146 and/or the processed RSO data store 180 in order to identify relevant search results. The merging performed by the data merger 144 is optional, however. For example, the data merger 144 may not merge a first set of RSO data with any other set of RSO data if the data merger 144 determines that the first set of RSO data corresponds to a first RSO and other sets of RSO data do not correspond to the first RSO. Instead, the data merger 144 can create a single data record based on the first set of RSO data.

In some cases, the RSO data obtained from different states or territories may include conflicting information. The data merger 144 can, for example, transmit the obtained RSO data to the third party verification service 160 (e.g., CLEAR, SMARTY, etc.), which can use external databases to verify names, addresses, and/or the like (e.g., replace a middle initial with the actual middle name, replace a shortened version of a first name with the full version of the first name, etc.) and/or which can use rules to place the RSO data in the proper format (e.g., convert a 5 digit zip code into a 9 digit zip code, convert a two digit year in the date of birth to a four digit year, etc.). The third party verification service 160 can then return updated RSO data that may resolve the conflict and/or identify which RSO data is accurate. The data merger 144 can then update the single data record with the updated RSO data provided by the third party verification service 160 (or use the updated RSO data in the process of creating the single data record for the RSO).

Once created, the data merger 144 can store the single data record for the RSO in the processed RSO data store 180 in an entry associated with the RSO. The stored single data record may also be referred to herein as a processed RSO data record. Thus, the processed RSO data store 180 may store merged and/or cleaned RSO data for one or more RSOs, regardless of the state or territory in which the RSO lives or from which the RSO data was obtained. In fact, a single data record stored in the processed RSO data store 180 may include information derived from different content pages published by different states or territories. The processed RSO data store 180 can then be queried in response to queries submitted by one or more user devices 102, one or more biometric devices 104, and/or one or more server/API systems 130 to provide appropriate search results.

For example, a user device 102, a biometric device 104, and/or a server/API system 130 can submit a search query to the data scraping and deduplication system 140 via the network 110. The search query can include a first name, a last name, a middle name, an address, a gender, a date of birth, an image, a driving license plate number, a passport number, an email address, a phone number, a unique identification number (e.g., a social security number), a fingerprint scan, an iris scan, a vein reading, other biometric data, radio frequency identification (RFID) tag data, barcode data, quick response (QR) code data, etc. The query processor 146 may receive the search query and use the contents of the search query to identify one or more names or identities that correspond to the search query and that should be searched. For example, the query processor 146 may use fuzzy matching to determine the names and/or identities to search. The query processor 146 may use a name as an input to a fuzzy matching operation and produce a list of related names as an output. Such related names can include variations on the inputted name (e.g., different ways to spell the name, corrections to transposed letters in the inputted name, aliases, etc.), nicknames corresponding to the inputted name, foreign language versions of the inputted name written (e.g., "Juan" for the inputted name "John"), etc. The query processor 146 can also use an address as an input to a fuzzy matching operation and produce a list of related addresses as an output (e.g., corrections to transposed numbers or letters in an inputted addresses, where the list of related addresses includes the address originally provided). Similarly, the query processor 146 can use a date of birth as an input to a fuzzy matching operation and produce a list of related dates of birth as an output (e.g., corrections to transposed dates in the inputted date of birth, such as an output of 7/11/1980 if 11/7/1980 is provided as an input, where the list of related dates of birth includes the date of birth originally provided). Thus, the query processor 146 can use names, addresses, genders, dates of birth, and/or any other information included in the search query as an input for a fuzzy matching operation. In return, the query processor 146 may produce a list of related names, addresses, dates of birth, etc. (including the information originally provided). The fuzzy matching operation can be customized such that the output varies based on a user's requirements, needs, or preferences. For example, factor(s) that affect the output of the fuzzy matching operation can be weighted differently per a user's requirements, needs, or preferences. Alternatively, the fuzzy matching functionality may be performed by an external third party service (not shown), and thus the query processor 146 may contact the external service to identify related names, addresses, dates of birth, etc.

Once the list of related names, addresses, dates of birth, etc. are obtained (which includes the name, address, date of birth, image, driving license plate number, passport number, email address, phone number, unique identification number (e.g., a social security number), fingerprint scan, iris scan, vein reading, other biometric data, RFID tag data, barcode data, QR code data, etc. originally provided in the search query), the query processor 146 can query the processed RSO data store 180 using one or more pieces of data in the obtained list. As a result, the processed RSO data store 180 may return any data records that include data matching any of the pieces of data included in the query submitted by the query processor 146 to the processed RSO data store 180.

As described herein, the processed RSO data store 180 can include data records for RSOs and other individuals that have been blacklisted. Thus, the data records returned by the processed RSO data store 180 can include data records for RSOs and/or data records for other individuals that have been blacklisted.

The query processor 146 can then optionally score and rank the received results. The manner in which the query processor 146 scores and ranks the received results can be customizable per a user's requirements, needs, or preferences. In particular, certain factors that affect the scoring and/or ranking can be weighted different per a user's requirements, needs, or preferences. Thus, the query processor 146 can score and rank received results differently for different users. For example, the query processor 146 can obtain data indicating the popularity of birth names during different periods of time (e.g., data indicating which birth names were most popular in different years). If a user searches for a name that was popular during the subject's birth year, the processed RSO data store 180 may return more data records than if a user searches for a name that was unpopular during the subject's birth year. Thus, given the number of data records that may be returned, the probability of a match is lower in situations in which the name that was searched is popular (as opposed to situations in which the name that was searched was unpopular, where the probability of a match may be higher). The query processor 146 can therefore use the birth name popularity data to score the received results to reflect the probability of a match.

For example, the query processor 146 can, for each data record returned by the processed RSO data store 180 (e.g., for each received result), identify the first name associated with the respective data record and the date of birth included in the respective data record. The query processor 146 can use the birth name popularity data to identify the popularity of the first name in the birth year, and assign a score to the corresponding data record based on the identified popularity. In an embodiment, the more popular the first name, the lower the score that the query processor 146 assigns to the corresponding data record. Likewise, the less popular the first name, the higher the score that the query processor 146 assigns to the corresponding data record. Once the query processor 146 has scored the data records returned by the processed RSO data store 180, the query processor 146 can rank the data records based on the assigned scores (e.g., where the highest ranked data record has the highest assigned score). The query processor 146 can then send the ranked data records to the user interface generator 148 so that the user device 102, the biometric device 104, and/or server/API system 130 can view the ranked search results, as described in greater detail below.

The query processor 146 may also be configured to handle batch queries. For example, a user device 102, a biometric device 104, and/or a server/API system 130 can submit multiple search queries at once, and the query processor 146 can process each search query in a manner as described herein in parallel, in sequence, and/or in a combination thereof. The search queries can be in any data format. As an illustrative example, the user device 102 can submit a list of names (e.g., a list of names that originate from a cruise or flight passenger manifest, a list of employees, etc.). The query processor 146 may identify each name in the list as a separate query, and perform independent searches on each of the names. As described in greater detail below, the user interface generator 148 can package the search results from each search into a single content page such that a user may not have to navigate through different windows or content pages or perform additional navigational steps in order to view the results of the batch search.

To improve the speed of search queries, the data scraping and deduplication system 140 (e.g., the query processor 146) may implement one or more techniques. For example, the data scraping and deduplication system 140 may include one or more central processing units (CPUs) and one or more graphical processing units (GPUs), among other hardware components. GPUs typically handle computer graphics computations. However, the GPUs may be configured to process more data per second than the CPUs. Thus, instead of having the CPU(s) execute instructions when attempting to process a search query submitted by a user device 102, a biometric device 104, and/or a server/API system 130, the data scraping and deduplication system 140 can have the GPU(s) execute the instructions. By having the GPU(s) execute instructions instead of the CPU(s), the time for processing one or more user device 102, biometric device 104, and/or server/API system 130 search queries may be reduced.

As another example, the data scraping and deduplication system 140 may include an in-memory index (not shown). When the data merger 144 generates the merged and/or cleaned data records, the data merger 144 can store some or all of these data records in the in-memory index alternatively or in addition to storing these data records in the processed RSO data store 180. The in-memory index may use FLASH memory, a solid state drive (SSD), or other storage mediums with fast read/write times. The processed RSO data store 180, however, may use a hard disk, which may have read/write times slower than the in-memory index. Thus, the query processor 146 can query the in-memory index rather than the processed RSO data store 180 to receive results faster and to reduce user device 102, biometric device 104, and/or server/API system 130 search query times.

As another example, the data scraping and deduplication system 140 may include a cache (not shown). If the query processor 146 receives a search query from a user device 102, a biometric device 104, and/or a server/API system 130, the query processor 146 can store the search query and/or the resulting data records returned by the processed RSO data store 180 (or by the in-memory index) in the cache. The search query and/or the resulting data records may be stored in the cache for a period of time (e.g., for a set period of time, until the cache is full and the search query and/or the resulting data records were the least recent pieces of data accessed from the cache, etc.). Thus, if a user device 102, biometric device 104, and/or server/API system 130 submits a search query that is the same as (or similar to) a previously submitted search query and the resulting data records are still present in the cache, the query processor 146 can retrieve the corresponding data records from the cache instead of identifying names and/or identities to query in the processed RSO data store 180. A search query may be similar to another search query if, for example, the search queries include the same first name and date of birth (but possibly different last name), the search queries include the same last name and address (but possible different first names due to a person having one or more aliases, dates of birth, etc.), and/or the like. Accordingly, the query processor 146 can use the cache to reduce user device 102, biometric device 104, and/or server/API system 130 search query times.

Once the query processor 146 has scored and/or ranked the data records returned by the processed RSO data store 180 (or otherwise has obtained ranked data records corresponding to a search query submitted by a user device 102, a biometric device 104, and/or a server/API system 130), the query processor 146 can send the ranked data records to the user interface generator 148. The user interface generator 148 can generate user interface data that, when processed by a user device 102, a biometric device 104, and/or server/API system 130, causes the user device to render and display a user interface depicting the ranked data records. As described herein, a data record can include RSO data, including names, addresses, images, etc. Thus, the user interface displayed by the user device 102, biometric device 104, and/or server/API system 130 may depict such RSO data.

In further embodiments, the query processor 146 can receive an address or zip code as a search query. In response, the query processor 146 can query the processed RSO data store 180 to identify data records that include an address and/or zip code that fall within a certain radius and/or distance of the received address or zip code. The query processor 146 can then send the identified data records to the user interface generator 148 so that the user interface generator 148 can generate user interface data that, when processed by a user device 102, biometric device 104, and/or server/API system 130, causes the user device 102, biometric device 104, and/or server/API system 130 to render and display a user interface depicting the location of any RSOs that reside within the radius or distance of the received address or zip code. In some cases, the received address or zip code may be near the border of a state or territory, and thus the radius or distance extends into another state or territory. The user interface may then depict, in one view, information for RSOs that reside in different states or territories. Current systems, as described herein, do not allow a user to simultaneously view RSO data originating from a plurality of states or territories. Rather, a user would have to navigate to different content pages published by the different states or territories in order to view similar information. Accordingly, the user interface rendered using the user interface data provided by the user interface generator 148 can reduce the number of navigational steps a user may have to take to view similar information.

Alternatively or in addition, the query processor 146 can produce search results using images provided by a user device 102, a biometric device 104, a server/API system 130, and/or the video system 150. For example, the user device 102 may include a camera. A user can capture an image using the capture, such as an image of a person. The user device 102 can transmit the image to the query processor 146 via the network 110, and the query processor 146 can query the processed RSO data store 180 to identify data records stored therein that include images of persons similar to the person in the image captured by the user device 102. In an embodiment, the query processor 146 can perform the query by retrieving one more data records from the processed RSO data store 180 and comparing the image captured by the user device 102 to the image(s) included in the retrieved data record(s). The query processor 146 can perform the comparison using facial recognition techniques. If the query processor 146 identifies a match (or a partial match) or does not identify any matches, the query processor 146 can provide an indication of whether a match was detected to the user interface generator 148. The user interface generator 148 can then generate user interface data that, when processed by the user device 102, causes the user device 102 to render and display a user interface indicating whether a match was detected and, if so, details of the match (e.g., the RSO data, including any images that caused the match). Alternatively or in addition, the query processor 146 can generate an alert indicating whether a match was detected and transmit the alert to the user device 102 via the network 110. The alert may include an indication of whether a match was detected and, if so, details of the match.

As another example, a biometric device 104 may capture and/or acquire an image depicting a fingerprint scan, an iris scan, a vein reading, and/or other biometric data. The biometric device 104 can transmit the image to the query processor 146 via the network 110. The query processor 146 can then process the image as described above with respect to an image captured by a user device 102. The query processor 146 can instruct the user interface generator 148 to generate user interface data with the search results and/or can generate and transmit an alert to the video system 150, the server/API system 130, the biometric device 104, and/or a user device 102.

As another example, a server/API system 130 may capture and/or acquire an image. The server/API system 130 can transmit the image to the query processor 146 via the network 110. The query processor 146 can then process the image and/or frame as described above with respect to an image captured by a user device 102. The query processor 146 can instruct the user interface generator 148 to generate user interface data with the search results and/or can generate and transmit an alert to the video system 150, the server/API system 130, and/or a user device 102.

As another example, the video system 150 may continuously or periodically capture images and/or video. When a person is detected in a captured image or video frame, the image and/or frame may be transmitted by the video system 150 to the query processor 146 via the network 110. The query processor 146 can then process the image and/or frame as described above with respect to an image captured by a user device 102. The query processor 146 can instruct the user interface generator 148 to generate user interface data with the search results and/or can generate and transmit an alert to the video system 150 and/or a user device 102. In some cases, user interface data and/or an alert may only be generated if a potential match is identified. A video system 150 may include one or more cameras, such as closed circuit (CC) cameras, security cameras, webcams, personal cameras or video recorders, and/or the like. The video system 150 may be present at a particular location, such as at a building (e.g., a commercial structure, a residential home, a retail store, an industrial warehouse, etc.), on a cruise ship or other common carrier, at a public place (e.g., a park, a school, a summer camp, a sidewalk, a street, etc.), and/or the like. Thus, personnel in charge of monitoring a particular location can be notified when a potential RSO is present.

As another example, a user device 102, a server/API system 130, and/or another computing system (not shown) can transmit a passenger manifest (e.g., for a cruise ship, for a flight, for a train, etc.) that includes, for each passenger, a name, other identifying information (e.g., address, gender, date of birth, etc.), and/or an image of the passenger. The query processor 146 can then produce search results using the name, other identifying information, and/or the image in a manner as described herein.

As another example, a user device 102, a server/API system 130, and/or another computing system (not shown) can transmit a student list (e.g., for a school in a school system, for a day care center, etc.), a member list (e.g., for an association or organization, such as the BOY SCOUTS OF AMERICA, a club, a religious organization, etc.), and/or the like that includes, for each student or member, a name, other identifying information (e.g., address, gender, date of birth, etc.), and/or an image of the student or member. The query processor 146 can then produce search results using the name, other identifying information, and/or the image in a manner as described herein.

In some embodiments, the query processor 146 can produce search results in a tiered manner. For example, the query processor 146 may first attempt to produce search results using images and facial recognition techniques. If the query processor 146 does not identify any matches in the data records stored in the processed RSO data store 180 and/or identified matches are associated with a confidence level below a threshold level, then the query processor 146 may attempt to produce search results using a name, an address, a gender, and/or a date of birth.

As an illustrative example, the video system 150 can include one or more cameras located at a port or dock, on an exterior of a cruise ship, and/or in an interior of a cruise ship. As a passenger of a cruise ship attempts to board the cruise ship at the port or dock, a camera in the video system 150 (e.g., a camera at the port or dock, or a camera exterior coupled to the exterior of the cruise ship) can capture an image and/or a video of the passenger, and transmit the image and/or one or more frames of the video to the query processor 146 via the network 110 for analysis. In particular, the query processor 146 can process the image and/or frame(s) obtained from the video system 150 and image(s) included in the data record(s) retrieved from the processed RSO data store 180 using facial recognition techniques (e.g., the query processor 146 can extract, from the images and/or frame(s), facial features, such as the relative position, size, and/or shape of eyes, nose, cheekbones, jaw, chin, eyebrows, mustaches, beards, sideburns, glasses, etc.). The query processor 146 can process the image(s) and/or frame(s) to identify similarities in facial features of a passenger depicted in the image and/or frame(s) and facial features of persons depicted in image(s) included in the retrieved data record(s). If one or more facial features of a passenger depicted in an image and/or frame(s) captured by a camera in the video system 150 are similar to one or more facial features of a person depicted in an image included in a retrieved data record within a threshold level (e.g., the relative position of the eyes of the passenger is within a threshold x-y coordinate of the eyes of a person depicted in an image included in a retrieved data record, the relative size of the nose of the passenger is within a threshold size of the nose of a person depicted in an image included in a retrieved data record, the relative shape of the jaw of the passenger is within a threshold angle, curvature, bend, etc. of or is of the same shape as the jaw of a person depicted in an image included in a retrieved data record, etc.), then the query processor 146 can provide an indication that a match was detected to the user interface generator 148. Thus, a possible RSO can be identified as the possible RSO attempts to board a cruise ship. Cruise ship personnel can then prevent the individual from boarding upon reception of an alert (e.g., at a user device 102 operated by the cruise ship personnel) indicating that a match was detected.

As another illustrative example, the same facial recognition techniques described above can be used on board a cruise ship or other common carrier. For example, one or more cameras of the video system 150 can be positioned within an interior of the cruise ship (e.g., within a main cabin of the cruise ship) (or on an exterior of the cruise ship and pointing toward an interior of the cruise ship). The video system 150 can periodically or continuously capture images and/or video as passengers move around the cruise ship, and the query processor 146 can receive such images and/or video for the purpose of identifying possible RSOs in a manner as described herein.

As another illustrative example, a cruise ship or other common carrier may include RFID readers positioned throughout an interior and/or exterior of the cruise ship. For example, passengers may have personal information, such as a first name, a last name, a middle name, an address, a gender, a date of birth, credit card number, user account information, passport number, an image, an email address, a phone number, a unique identification number (e.g., a social security number), etc., stored on an RFID tag. A passenger can then place the RFID tag near an RFID reader to verify the passenger's identity in order to make purchases, enter venues, check in for activities, etc. A camera of the video system 150 can be positioned such that a lens of the camera points at an RFID reader. Thus, when a passenger places an RFID tag near an RFID reader, information obtained from the RFID tag by the RFID reader can be coupled with an image or video captured by the video system 150. Thus, personal information of a passenger can then be coupled with an image or video of the passenger, and the query processor 146 can use some or all of the personal information and/or the image or video frame(s) to determine whether the passenger is a possible RSO in a manner as described herein.

Thus, the query processor 146 can take images as an input, and provide names or other RSO data of possible RSOs that are captured within such images. Law enforcement, security personnel, school administrators, transportation personnel, and/or the like can therefore use the data scraping and deduplication system 140 to identify potential RSOs, even if such potential RSOs provide incorrect names or otherwise try to hide their identities.

Alternatively or in addition, the query processor 146 can produce search results using biometric data (e.g., fingerprint scan data, iris scan data, vein reading data, etc.), RFID data, barcode data, QR code data, etc. provided by a biometric device 104. For example, the biometric device 104 may include an electronic reader, scanner, and/or the like that allows the biometric device 104 to capture biometric data, RFID data, barcode data, QR code data, etc. The biometric device 104 can capture the data automatically (such as when a person is present and/or touching the electronic reader or scanner) and/or in response to an instruction inputted by a user. The biometric device 104 can transmit the captured data to the query processor 146 via the network 110, and the query processor 146 can query the processed RSO data store 180 to identify data records stored therein that include biometric data, RFID data, barcode data, QR code data, etc. similar to the captured data. In an embodiment, the query processor 146 can perform the query by retrieving one more data records from the processed RSO data store 180 and comparing the captured data to the biometric data, RFID data, barcode data, QR code data, etc. included in the retrieved data record(s). If the query processor 146 identifies a match (or a partial match) or does not identify any matches, the query processor 146 can provide an indication of whether a match was detected to the user interface generator 148. The user interface generator 148 can then generate user interface data that, when processed by a user device 102, the biometric device 104, and/or server/API system 130 causes the user device 102, biometric device 104, and/or server/API system 130 to render and display a user interface indicating whether a match was detected and, if so, details of the match (e.g., the RSO data, including any biometric data, RFID data, barcode data, QR code data, etc. that caused the match). Alternatively or in addition, the query processor 146 can generate an alert indicating whether a match was detected and transmit the alert to the user device

102, biometric device 104, and/or server/API system 130 via the network 110. The alert may include an indication of whether a match was detected and, if so, details of the match.

The data scraping and deduplication system 140, the external data source 120, the server/API system 130, and/or the third party verification service 160 may each be a single computing device, or may include multiple distinct computing devices, such as computer servers, logically or physically grouped together to collectively operate as a server system. The components of the data scraping and deduplication system 140, the external data source 120, the server/API system 130, and/or the third party verification service 160 can be implemented in application-specific hardware (e.g., a server computing device with one or more ASICs) such that no software is necessary, or as a combination of hardware and software. In addition, the modules and components of the data scraping and deduplication system 140, the external data source 120, the server/API system 130, and/or the third party verification service 160 can be combined on one server computing device or separated individually or into groups on several server computing devices. In some embodiments, the data scraping and deduplication system 140, the external data source 120, the server/API system 130, and/or the third party verification service 160 may include additional or fewer components than illustrated in FIG. 1.

The server/API system 130 may be configured to transmit requests, API calls, and/or other messages to the data scraping and deduplication system 140 to perform any of the operations described herein. The user devices 102 and the server/API system 130 may use the data scraping and deduplication system 140 in a similar manner to run one or more queries.

In some embodiments, the features and services provided by the data scraping and deduplication system 140 and/or the third party verification service 160 may be implemented as web services consumable via the communication network 110. In further embodiments, the data scraping and deduplication system 140 and/or the third party verification service 160 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The raw RSO data store 170 stores unprocessed or raw RSO data and may be managed by one or more states or territories. While the raw RSO data store 170 is depicted as being located external to the data scraping and deduplication system 140, this is not meant to be limiting. For example, in other embodiments not shown, the raw RSO data store 170 is located internal to the data scraping and deduplication system 140.

The processed RSO data store 180 stores RSO data merged and/or cleaned by the data merger 144. In further embodiments, the processed RSO data store 180 also stores data for non-RSOs that otherwise are blacklisted. For example, blacklisted individuals can be individuals that are banned from attending an event, joining an organization, boarding a vehicle, entering a location, etc. for failing to pay a tab, committing a violation, being unruly, and/or the like. While the processed RSO data store 180 is depicted as being located external to the data scraping and deduplication system 140, this is not meant to be limiting. For example, in other embodiments not shown, the processed RSO data store 180 is located internal to the data scraping and deduplication system 140.

While the data scraping and deduplication system 140, the third party verification service 160, and the processed RSO data store 180 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as an improved query service) can communicate with one or more of the user devices 102, the biometric devices 104, and/or the server/API systems 130 via the network 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In one embodiment, the user devices 102 runs a browser application in order to communicate with the data scraping and deduplication system 140.

The biometric device 104 can be any physical device configured to obtain biometric data or other related data of a person. For example, the biometric device 104 can obtain a fingerprint scan of one or more fingers of a person, an iris scan of one or more eyes of a person, a vein reading of one or more veins of a person, and/or the like. The biometric device 104 can also be an RFID reader configured to obtain data from an RFID tag placed near the RFID reader, a barcode reader configured to scan barcodes, a QR reader configured to scan QR codes, and/or the like. The biometric device 104 can include obtained data in a search query sent to the data scraping and deduplication system 140 (e.g., the query processor 146). The query processor 146 can then use the obtained biometric or related data to identify possible matches. As an illustrative example, the biometric device 104 can be an iris scanner that scans irises as people pass by or stop in front of the biometric device 104. Once an iris is scanned, the biometric device 104 may include the iris scan data in a search query and send the search query to the data scraping and deduplication system 140. As another illustrative example, the RFID tag may store a first name, a last name, a middle name, an address, a gender, a date of birth, credit card number, user account information, passport number, license plate number, an image, a driving license plate number, an email address, a phone number, a unique identification number (e.g., a social security number), etc. The biometric device 104 can then read the RFID tag to obtain the stored data and include such data in a search query.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet.

In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagrams for Obtaining RSO Data

Figure 2A:
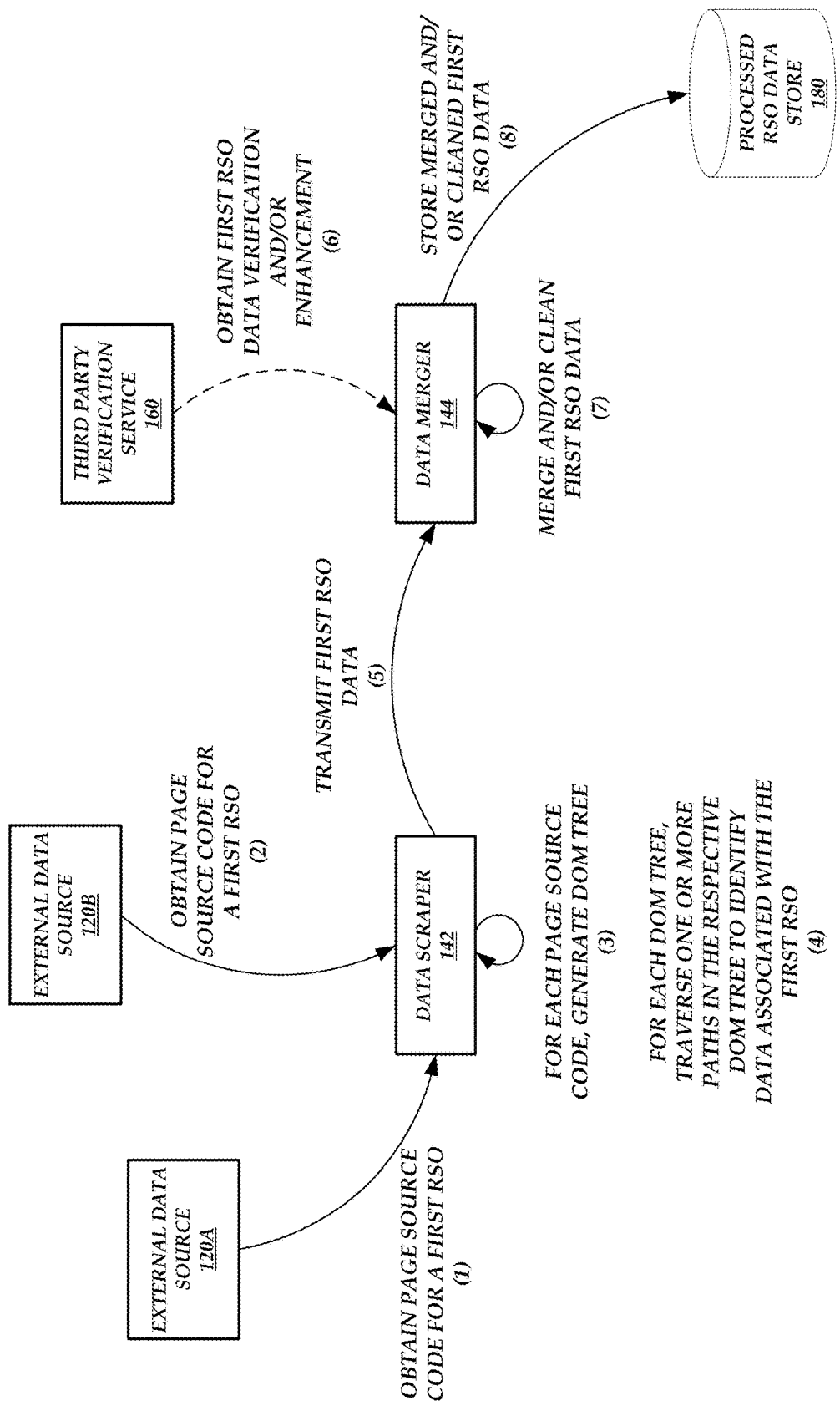
FIG. 2A is a block diagram of the operating environment of FIG. 1 illustrating the operations performed by the components of the operating environment to obtain RSO data, according to one embodiment.

FIG. 2A is a block diagram of the operating environment 100 of FIG. 1 illustrating the operations performed by the components of the operating environment 100 to obtain RSO data, according to one embodiment. As illustrated in FIG. 2A, the data scraper 142 obtains page source code for a first RSO from an external data source 120A at (1). For example, the external data source 120A may provide content pages published by a first state or territory.

The data scraper 142 may also obtain page source code for a first RSO from an external data source 120B at (2). For example, the external data source 120B may provide content pages published by a second state or territory. Here, the first RSO may be registered in two different states or territories.

For each page source code, the data scraper 142 can generate a DOM tree at (3). The data scraper 142 can then, for each DOM tree, traverse one or more paths in the respective DOM tree to identify data associated with the first RSO at (4). As described herein, content pages published by one state or territory may have a different format or layout than content pages published by another state or territory. Thus, the data scraper 142 may select a first path through the DOM tree associated with the source code obtained from the external data source 120A, and may select the same path or a different path through the DOM tree associated with the source code obtained from the external data source 120B. The data scraper 142 can then transmit the identified first RSO data to the data merger 144 at (5).

The data merger 144 may optionally obtain first RSO data verification and/or enhancement from the third party verification service 160 at (6). For example, as described herein, the third party verification service 160 can verify that names, addresses, etc. are accurate, provide missing information to enhance the identified RSO data (e.g., replace middle initials with full middle names, provide the full 9 digit zip code, etc.), and/or the like. The data merger 144 can then merge and/or clean the first RSO data at (7). For example, the data merger 144 can merge the first RSO data identified from traversal of the DOM tree associated with the source code from the external data source 120A with the first RSO data identified from traversal of the DOM tree associated with the source code from the external data source 120B and/or can clean the first RSO data (e.g., place the first RSO data in the proper format, fill in missing information, with optional help from the third party verification service 160, etc.) to form a single data record. The single data record may also be referred to as a processed RSO data record, a merged and/or cleaned data record, and/or merged and/or cleaned RSO data. The data merger 144 can then store the merged and/or cleaned first RSO data in the processed RSO data store 180 at (8).

Figure 2B:
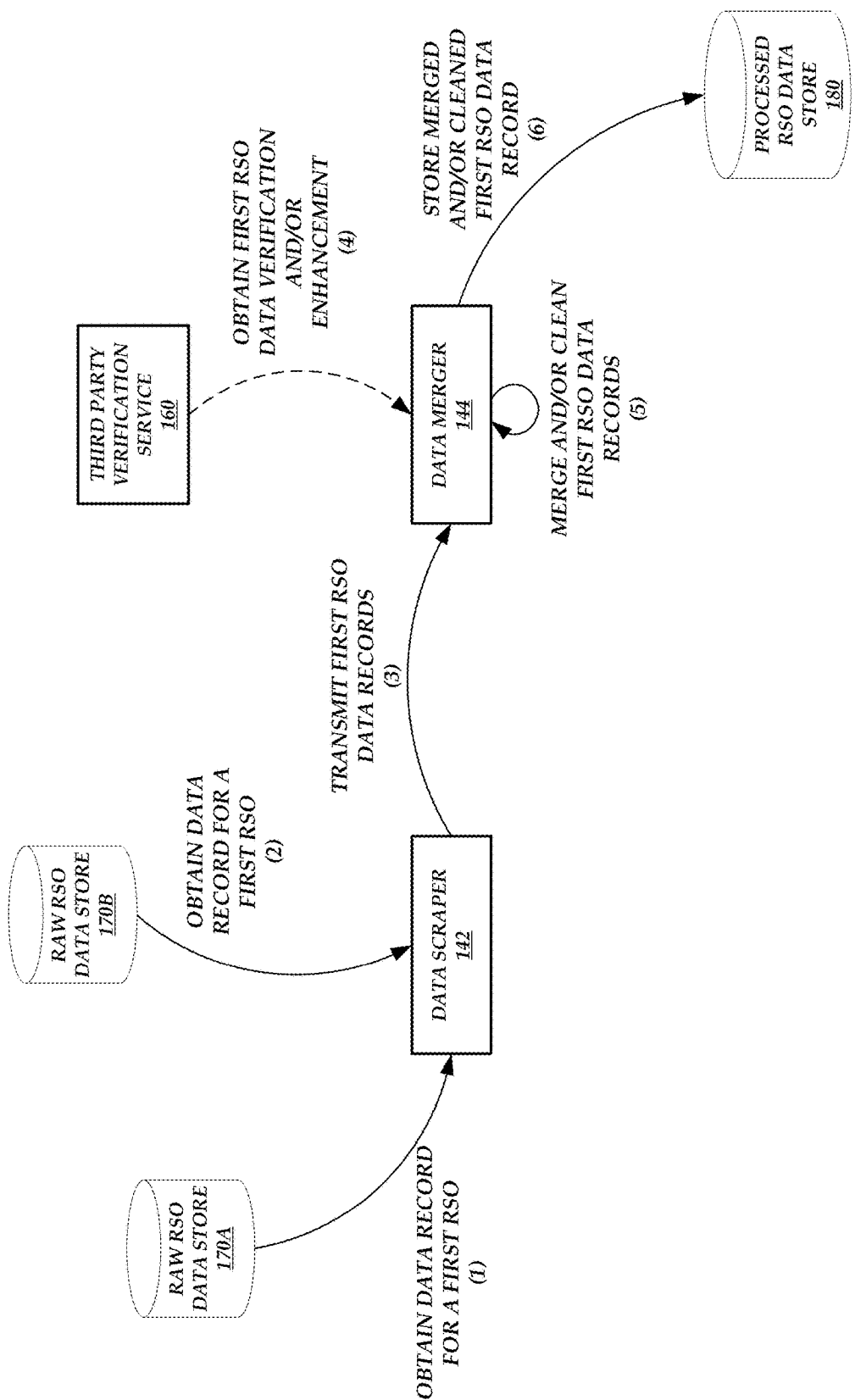
FIG. 2B is another block diagram of the operating environment of FIG. 1 illustrating the operations performed by the components of the operating environment to obtain RSO data, according to one embodiment.

FIG. 2B is another block diagram of the operating environment 100 of FIG. 1 illustrating the operations performed by the components of the operating environment 100 to obtain RSO data, according to one embodiment. As illustrated in FIG. 2A, the data scraper 142 obtains a data record for a first RSO from a raw RSO data store 170A at (1). For example, the raw RSO data store 170A may store RSO data for a first state or territory.

The data scraper 142 may also obtain a data record for a first RSO from a raw RSO data store 170B at (2). For example, the raw RSO data store 170B may store RSO data for a second state or territory. Here, the first RSO may be registered in two different states or territories. The data scraper 142 can then transmit the first RSO data records to the data merger 144 at (3).

The data merger 144 may optionally obtain first RSO data verification and/or enhancement from the third party verification service 160 at (4). For example, as described herein, the third party verification service 160 can verify that names, addresses, etc. are accurate, provide missing information to enhance the identified RSO data (e.g., replace middle initials with full middle names, provide the full 9 digit zip code, etc.), and/or the like. The data merger 144 can then merge and/or clean the first RSO data records at (5). For example, the data merger 144 can merge the first RSO data record obtained from the raw RSO data store 170A with the first RSO data record obtained from the raw RSO data store 170B and/or can clean the first RSO data records (e.g., place the first RSO data in the proper format, fill in missing information, with optional help from the third party verification service 160, etc.) to form a single data record. The single data record may also be referred to as a processed RSO data record, a merged and/or cleaned RSO data record, and/or merged and/or cleaned RSO data. The data merger 144 can then store the merged and/or cleaned first RSO data record in the processed RSO data store 180 at (6).

Example Block Diagrams for Querying RSO Data

Figure 3:
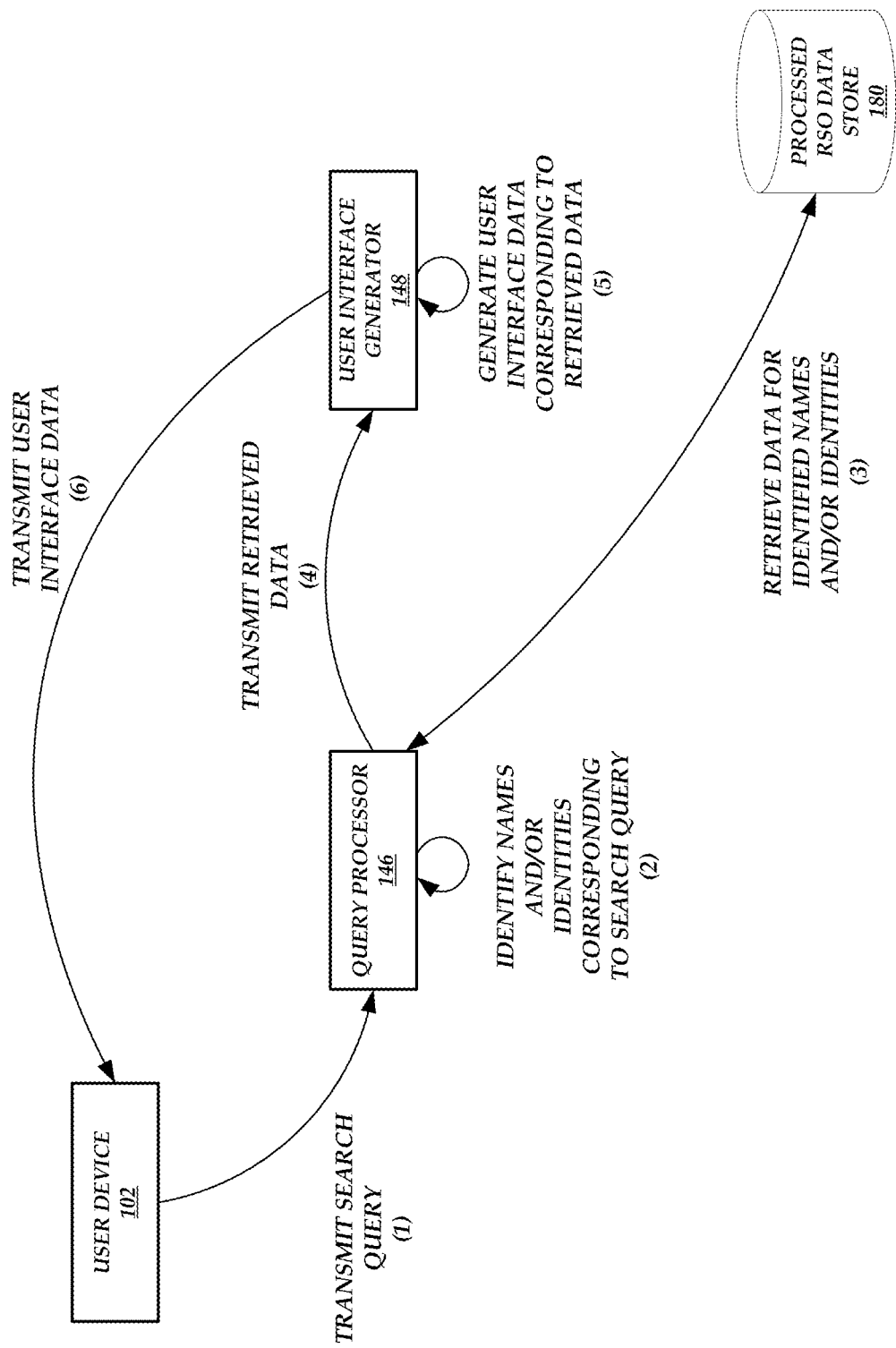
FIG. 3 is a block diagram of the operating environment of FIG. 1 illustrating the operations performed by the components of the operating environment to query RSO data, according to one embodiment.

FIG. 3 is a block diagram of the operating environment 100 of FIG. 1 illustrating the operations performed by the components of the operating environment 100 to query RSO data, according to one embodiment. As illustrated in FIG. 3, a user device 102 transmits a search query to the query processor 146 at (1). For example, the search query may include a first name, a last name, a middle name, an address, a gender, a date of birth, and/or the like.

The query processor 146 can identify names and/or identities corresponding to the search query at (2). For example, the query processor 146 can determine the names and/or identities to search using fuzzy matching. The query processor 146 may use a name as an input and produce a list of related names as an output (where the list of related names includes the name originally provided). Such related names can include variations on the inputted name (e.g., different ways to spell the name, corrections to transposed letters in the inputted name, aliases, etc.), nicknames corresponding to the inputted name, foreign language versions of the inputted name written (e.g., "Juan" for the inputted name "John"), etc. The query processor 146 can also use an address as an input to a fuzzy matching operation and produce a list of related addresses as an output (e.g., corrections to transposed numbers or letters in an inputted addresses, where the list of related addresses includes the address originally provided). Similarly, the query processor 146 can use a date of birth as an input to a fuzzy matching operation and produce a list of related dates of birth as an output (e.g., corrections to transposed dates in the inputted date of birth, such as an output of 7/11/1980 if 11/7/1980 is provided as an input, where the list of related dates of birth includes the date of birth originally provided). Thus, the query processor 146 can use names, addresses, genders, dates of birth, and/or any other information included in the search query as an input for a fuzzy matching operation. In return, the query processor 146 may produce a list of related names, addresses, dates of birth, etc. (including the information originally provided). Alternatively, the fuzzy matching functionality may be performed by an external third party service (not shown), and thus the query processor 146 may contact the external service to identify related names, addresses, dates of birth, etc.

The query processor 146 can then retrieve data for the identified names and/or identities from the processed RSO data store 180 at (3). For example, the query processor 146 can query the processed RSO data store 180 using the original information included in the search query and the identified related names, addresses, dates of birth, etc. to obtain data records that include at least some of the queried information. The query processor 146 can then transmit the retrieved data to the user interface generator 148 at (4).

The user interface generator 148 can generate user interface data corresponding to the retrieved data at (5). For example, the user interface data, when processed by the user device 102, may cause the user device 102 to render and display a user interface that depicts the retrieved data. The user interface generator 148 can then transmit the user interface data to the user device 102 at (6).

Figure 4:
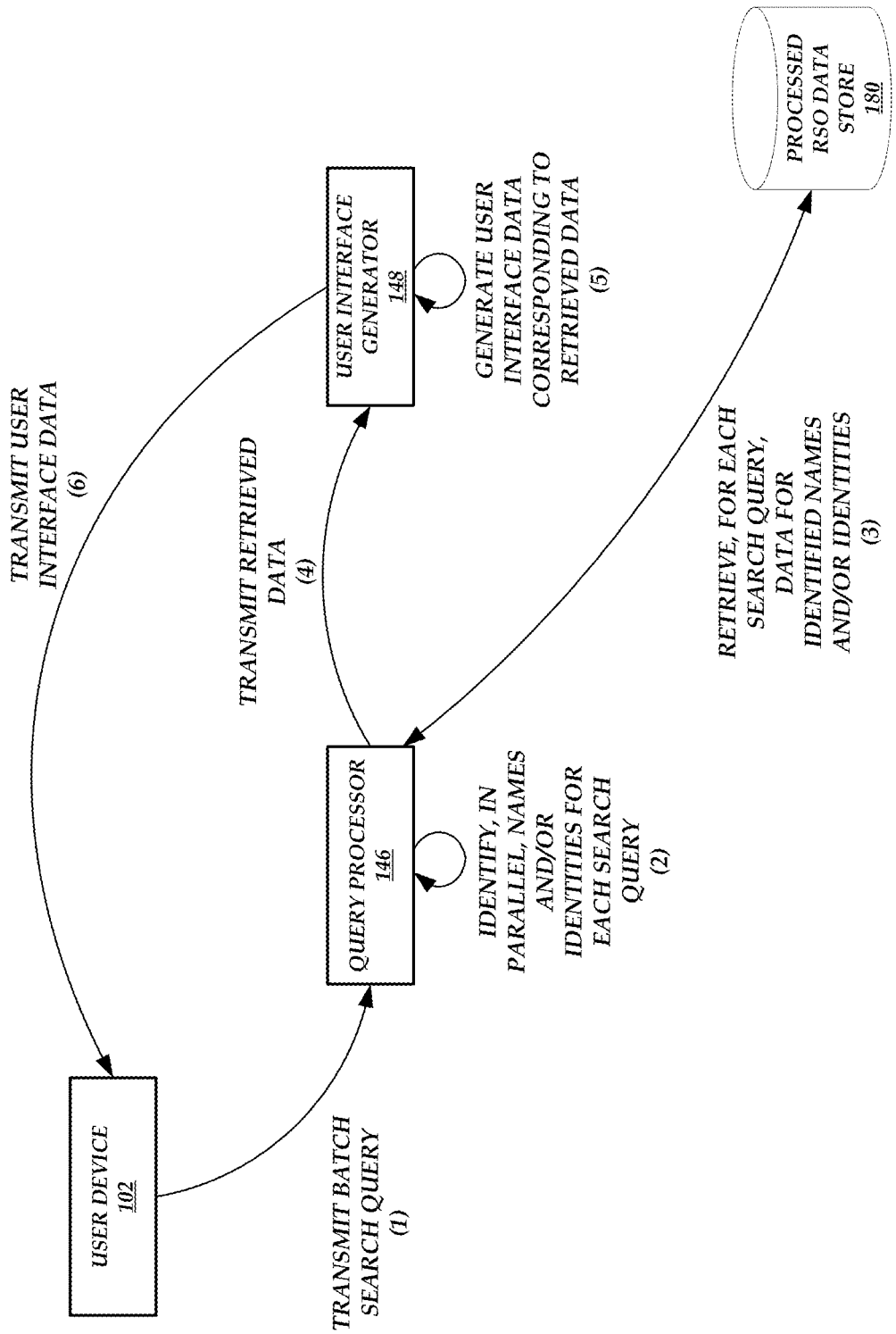
FIG. 4 is a block diagram of the operating environment of FIG. 1 illustrating the operations performed by the components of the operating environment to perform a batch query, according to one embodiment.

FIG. 4 is a block diagram of the operating environment 100 of FIG. 1 illustrating the operations performed by the components of the operating environment 100 to perform a batch query, according to one embodiment. As illustrated in FIG. 4, a user device 102 transmits a batch search query to the query processor 146 at (1). For example, the batch search query may include a plurality of search queries that each include a first name, a last name, a middle name, an address, a gender, a date of birth, and/or the like. As an illustrative example, the batch search query may be a list of names, where each name corresponds to a single search query.

The query processor 146 can identify, in parallel, names and/or identities corresponding to each search query included in the batch search query at (2). For example, the query processor 146 can use fuzzy matching to determine the names and/or identities to search. Alternatively, the fuzzy matching functionality may be performed by an external third party service (not shown).

The query processor 146 can then, for each search query in the batch search query, retrieve data for the identified names and/or identities from the processed RSO data store 180 at (3). For example, the query processor 146 can query the processed RSO data store 180 using the original information included in the respective search query and the identified related names, addresses, dates of birth, etc. to obtain data records that include at least some of the queried information. The query processor 146 can then transmit the retrieved data to the user interface generator 148 at (4).

The user interface generator 148 can generate user interface data corresponding to the retrieved data at (5). For example, the user interface data, when processed by the user device 102, may cause the user device 102 to render and display a user interface that depicts the retrieved data, where the retrieved data includes search results for some or all of the search queries in the batch search query. The user interface generator 148 can then transmit the user interface data to the user device 102 at (6).

While FIGS. 3 and 4 depict the user device 102 transmitting a search query or a batch search query, this is not meant to be limiting. A server/API system 130 could instead transmit the search query or the batch search query to the query processor 146, such as via an API call that includes the search query or the batch search query. Similarly, a biometric device 104 could instead transmit the search query or the batch search query to the query processor 146.

Figure 5:
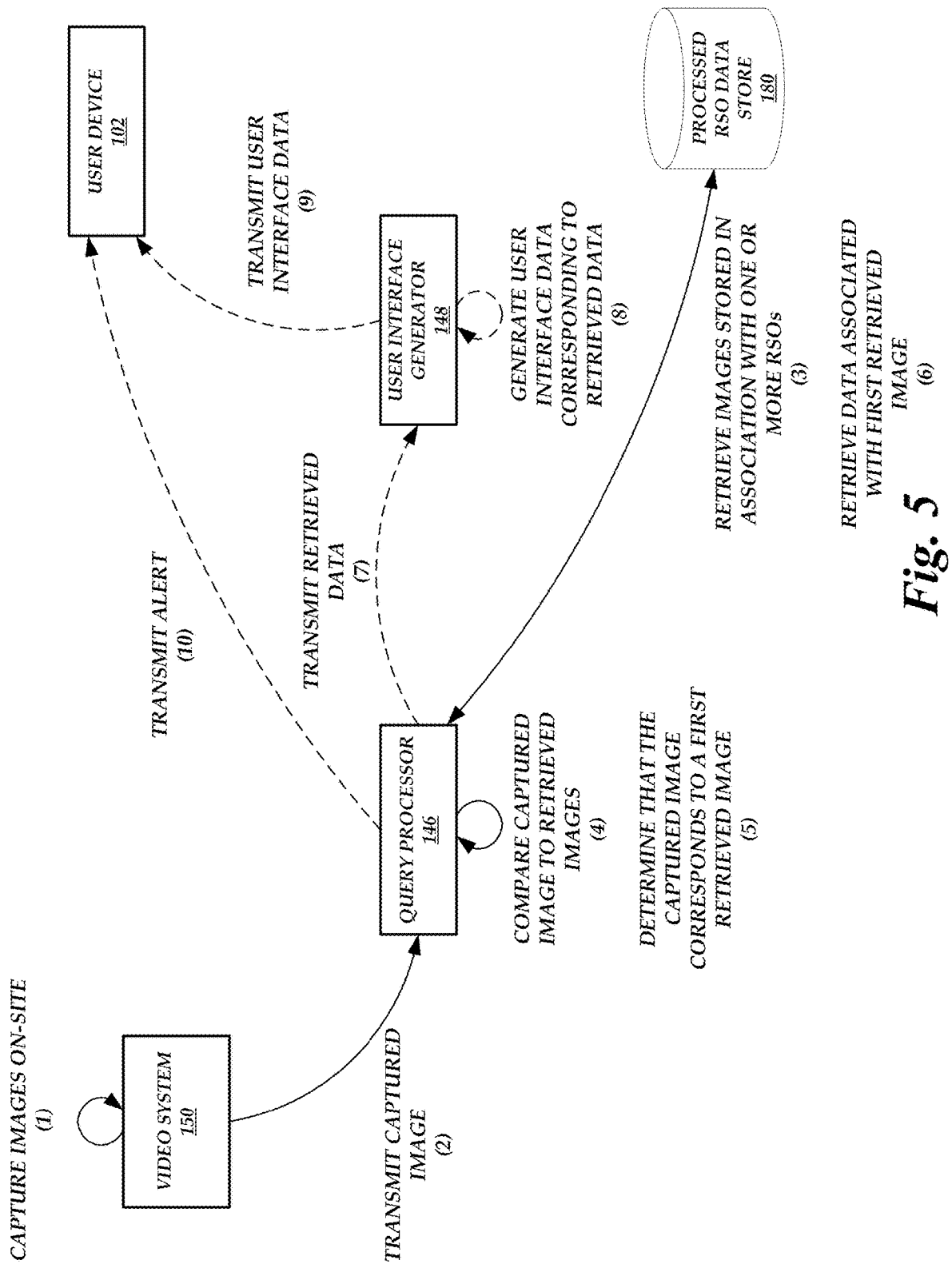
FIG. 5 is a block diagram of the operating environment of FIG. 1 illustrating the operations performed by the components of the operating environment to query RSO data using an image, according to one embodiment.

FIG. 5 is a block diagram of the operating environment 100 of FIG. 1 illustrating the operations performed by the components of the operating environment 100 to query RSO data using an image, according to one embodiment. As illustrated in FIG. 5, the video system 150 captures images on-site at (1). For example, the site can be a building, a common carrier, a public place, etc. Periodically and/or when a person is detected in a captured image, the video system 150 transmits a captured image to the query processor 146 at (2). For example, the captured image may depict a person (e.g., a full profile of the person, the person's face, another feature of the person, such as a tattoo, etc.). Alternatively, the image may be captured by a user device 102 (e.g., via an application running on the user device 102 that accesses the user device's 102 camera). The image can be a still image or a frame from captured video.

The query processor 146 can retrieve images stored in association with one or more RSOs from the processed RSO data store 180 at (3). For example, the processed RSO data store 180 may include one or more data records, and some or all of the data records may include one or more images associated with the RSO that corresponds to the data record (e.g., an image of the RSO's face, body, unique feature (e.g., birthmark, tattoo, etc.), etc.). The query processor 146 can then compare the captured image with the retrieved images at (4). For example, the query processor 146 can use facial recognition techniques to perform the comparison. Here, the query processor 146 determines that the captured image corresponds to a first retrieved image at (5). As a result, the query processor 146 retrieves data associated with the first retrieved image from the processed RSO data store 180 at (6). For example, the query processor 146 can retrieve RSO data from the data record that included the image that corresponded to (e.g., matched or nearly matched) the captured image.

Optionally, the query processor 146 can transmit the retrieved data to the user interface generator 148 at (7). The user interface generator 148 can optionally generate user interface data corresponding to the retrieved data at (8). For example, the user interface data, when processed by a user device 102, may cause the user device 102 to render and display a user interface that depicts the retrieved data, where the retrieved data includes RSO data for the RSO that appears to correspond to the person depicted in the captured image. The user interface generator 148 can then optionally transmit the user interface data to the user device 102 at (9).

Alternatively or in addition, the query processor 146 can generate and transmit an alert to the user device 102 at (10). For example, the alert can indicate whether the captured image matched or nearly matched any RSO and, if so, corresponding RSO data for that RSO. The alert can be an electronic message, a text message, an instant message, a push notification, and/or the like.

While FIG. 5 depicts the video system 150 transmitting a captured image, this is not meant to be limiting. A user device 102, a biometric device 104, and/or a server/API system 130 could also transmit a captured image to the query processor 146.

Example RSO Data Retrieval Routine

Figure 6:
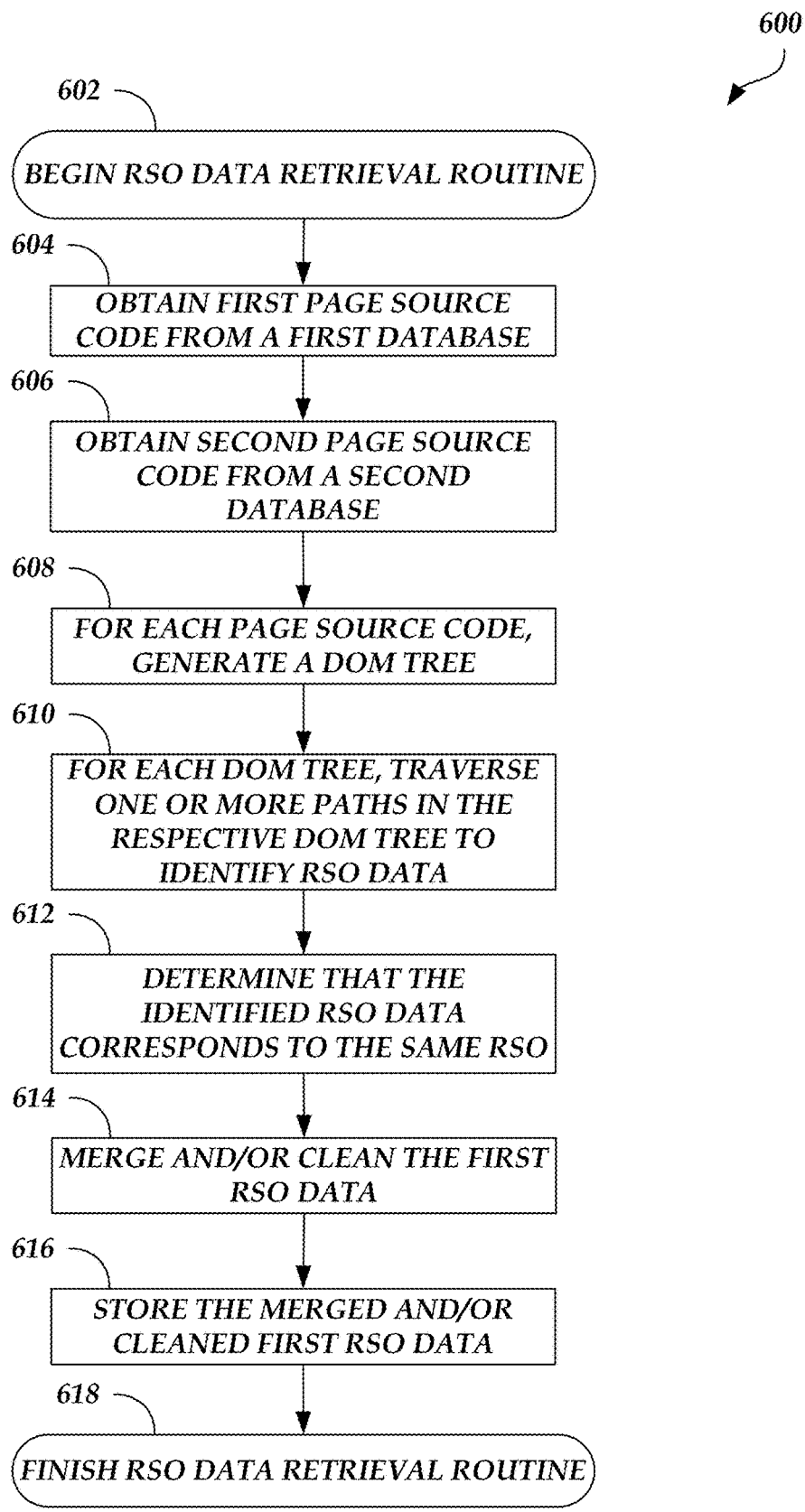
FIG. 6 is a flow diagram depicting an RSO data retrieval routine illustratively implemented by a data scraper and deduplication system, according to one embodiment.

FIG. 6 is a flow diagram depicting an RSO data retrieval routine 600 illustratively implemented by a data scraper and deduplication system, according to one embodiment. As an example, the data scraper and deduplication system 140 of FIG. 1 can be configured to execute the RSO data retrieval routine 600. The RSO data retrieval routine 600 begins at block 602.

At block 604, first page source code from a first database is obtained. For example, a first state or territory may manage the first database. The first database may be a data store or may be a CDN that serves content pages.

At block 606, second page source code from a second database is obtained. For example, a second state or territory may manage the second database. The second database may be a data store or may be a CDN that serves content pages.

At block 608, a DOM tree is generated for each page source code. The DOM trees may each include various nodes that represent elements in a content page.

At block 610, for each DOM tree, one or more paths in the respective DOM tree are traversed to identify RSO data. As described herein, the same or different paths may be traversed in each DOM tree.

At block 612, the identified RSO data is determined to correspond to the same RSO. For example, the RSO data identified from traversing the first DOM tree (e.g., the DOM tree derived from the first page source code) may share data (e.g., first name, last name, middle name, date of birth, etc.) with the RSO data identified from traversing the second DOM tree (e.g., the DOM tree derived from the second page source code).

At block 614, the first RSO data is merged and/or cleaned. For example, because the identified RSO data correspond to the same RSO, the RSO data identified from each traversal may be merged into a single data record. Thus, a deduplication operation can be performed (e.g., by merging the RSO data or, if one set of RSO data includes all of the data present in another set of RSO data, deleting the set of RSO data that includes duplicate information) to form the single data record.

At block 616, the merged and/or cleaned first RSO data is stored. After storing the merged and/or cleaned first RSO data, the RSO data retrieval routine is complete, as shown at block 618.

Example Test Data Scraping Routine

Figure 7:
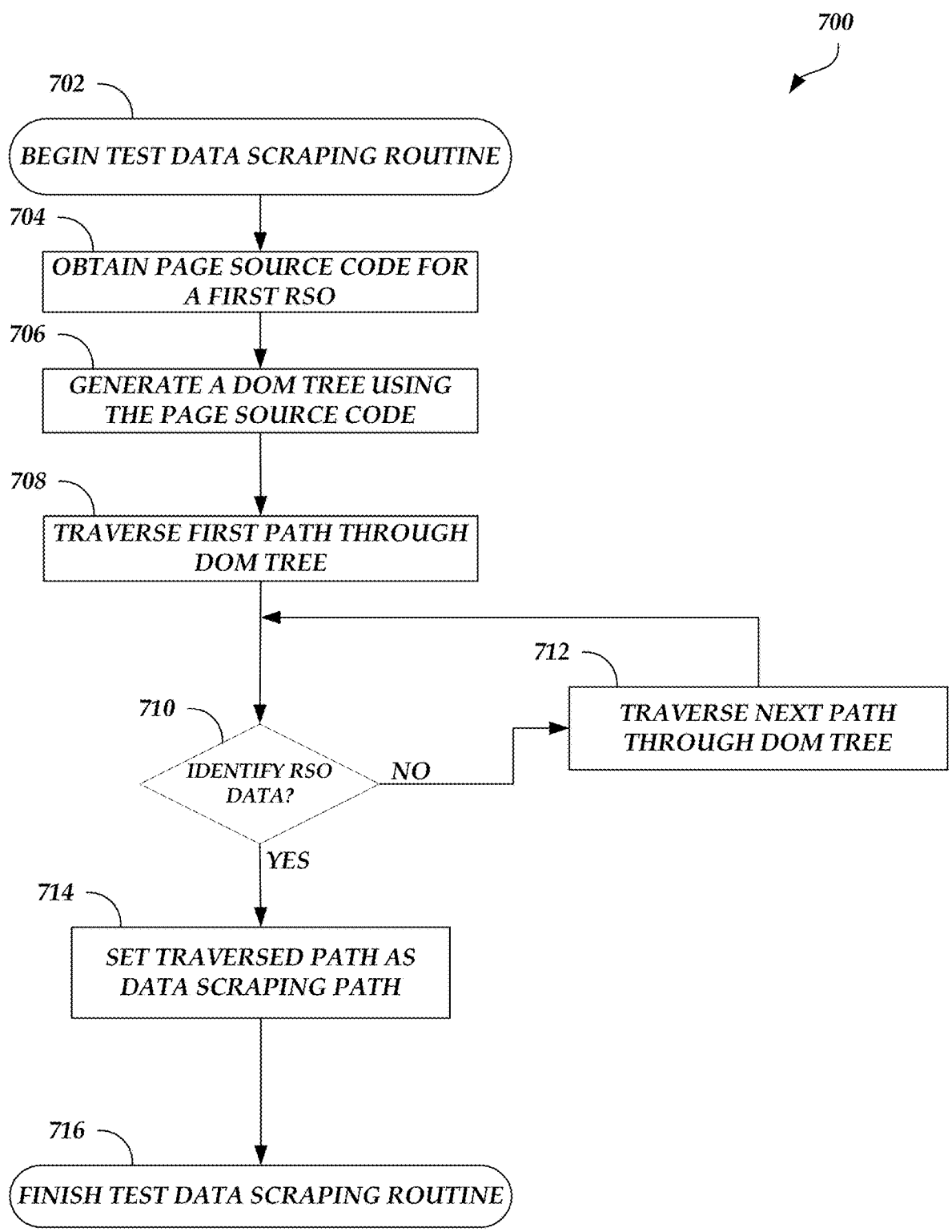
FIG. 7 is a flow diagram depicting a test data scraping routine illustratively implemented by a data scraper and deduplication system, according to one embodiment.

FIG. 7 is a flow diagram depicting a test data scraping routine 700 illustratively implemented by a data scraper and deduplication system, according to one embodiment. As an example, the data scraper and deduplication system 140 of FIG. 1 can be configured to execute the test data scraping routine 700. The test data scraping routine 700 begins at block 702.

At block 704, page source code for a first RSO is obtained. For example, the source code may correspond to a content page published by a state or territory.

At block 706, a DOM tree is generated using the page source code. The DOM tree may include various nodes that represent elements in a content page.

At block 708, a first path through the DOM tree is traversed. The first path may be a path previously used in traversals of DOM trees derived from content pages published by the same state or territory when attempting to identify RSO data.

At block 710, a determination is made as to whether RSO data was identified. If RSO data was identified during the traversal (e.g., in a leaf node of the path), then the test data scraping routine 700 proceeds to block 714. Otherwise, if the RSO data was not identified during the traversal (e.g., in a leaf node of the path), then the test data scraping routine 700 proceeds to block 712.

At block 712, the next path through the DOM tree is traversed. The test data scraping routine 700 then reverts back to block 710.

At block 714, the traversed path that resulted in identification of the RSO data is set as the data scraping path. Thus, when attempting to obtain RSO data in the future from content pages published by the same state or territory, the data scraper and deduplication system 140 will traverse the data scraping path (e.g., because this path has been identified as the path that will result in identification of RSO data). After setting the traversed path as the data scraping path, the test data scraping routine is complete, as shown at block 716.

Example RSO Data Search Routine

Figure 8:
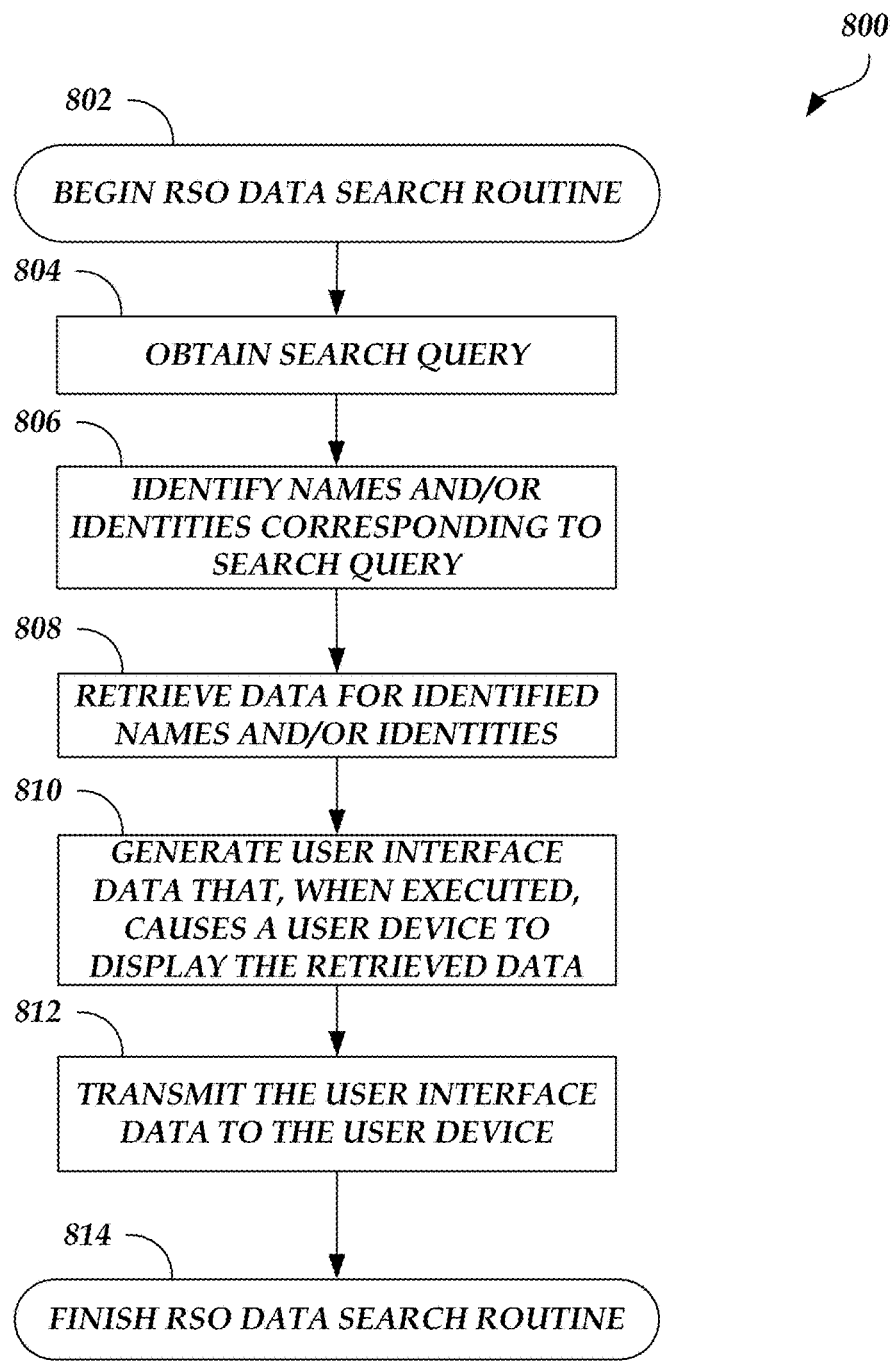
FIG. 8 is a flow diagram depicting an RSO data search routine illustratively implemented by a data scraper and deduplication system, according to one embodiment.

FIG. 8 is a flow diagram depicting an RSO data search routine 800 illustratively implemented by a data scraper and deduplication system, according to one embodiment. As an example, the data scraper and deduplication system 140 of FIG. 1 can be configured to execute the RSO data search routine 800. The RSO data search routine 800 begins at block 802.

At block 804, a search query is obtained. The search query may include a name, an address, a date of birth, a gender, a race, an image, and/or the like.

At block 806, names and/or identities corresponding to the search query are identified. The identified names and/or identities may include the originally searched name and any related names.

At block 808, data for the identified names and/or identities is retrieved. For example, the data may be RSO data retrieved from the processed RSO data store 180.

At block 810, user interface data is generated that, when executed or processed, causes a user device to display the retrieved data. For example, the retrieved data may be displayed in a user interface.

At block 812, the user interface data is transmitted to the user device. After the user interface data is transmitted to the user device, the RSO data search routine is complete, as shown at block 814.

Example Improved User Interface

Figure 9:
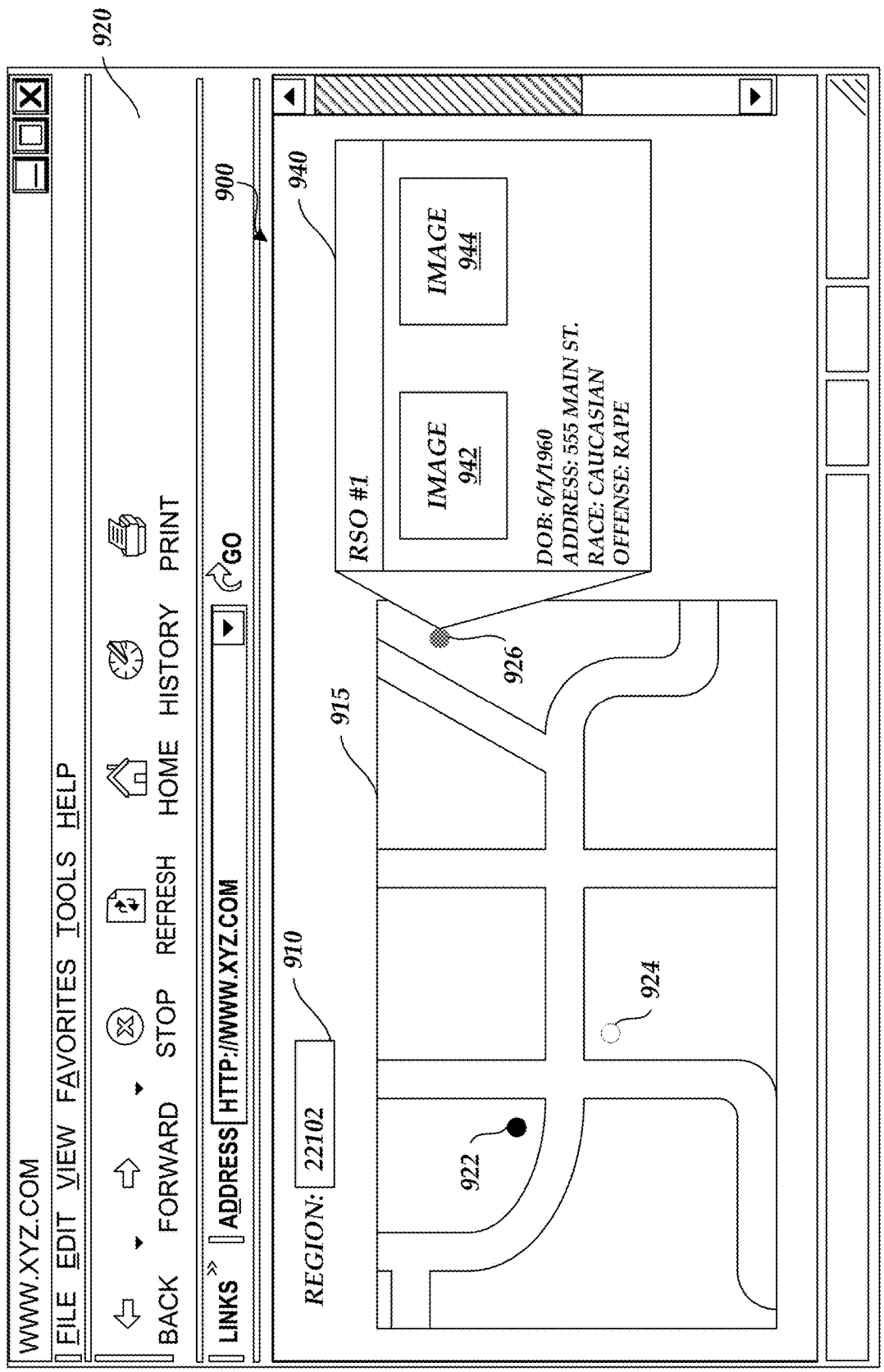
FIG. 9 illustrates an example user interface 900 depicting a content page that is displayed in a browser application running on a user device, such as the user device of FIG. 1.

FIG. 9 illustrates an example user interface 900 depicting a content page that is displayed in a browser application 920 running on a user device, such as the user device 102 of FIG. 1. The user interface data that, when rendered, causes the user device 102 to display the user interface 900 may have been generated by the user interface generator 148.

As illustrated in FIG. 9, the user interface 900 includes a search field 910 in which an address, zip code, or other representation of a region (e.g., geographic coordinates, a name of a city, a name of a county, a name of a state, etc.) can be entered by a user. Here, a user has entered a zip code in the field 910. In response to a user entering a representation of a region, the query processor 146 can receive the entered representation, query the processed RSO data store 180 to identify data records corresponding to addresses within a radius or distance of the region (or within the region itself), and provide the identified data records to the user interface generator 148 so that the user interface generator 148 can generate the user interface data that results in the user interface 900 illustrated in FIG. 9. In an embodiment, not shown, the radius or distance can be set by the user via the user interface 900.

In particular, in response to the user entering the zip code in the search field 910, the user interface 900 may be updated to depict a map 915. The map 915 may visually depict the area defined by the entered region or by the entered region plus a radius or distance extending from the entered region. The map 915 may indicate the locations at which RSOs in the area reside. For example, icons 922, 924, and 926 may indicate locations at which RSOs in the area reside. The icons 922, 924, and/or 926 may be shaded or color-coded to indicate the different types of RSOs that reside in the area. As an illustrative example, RSOs that have targeted minors may be represented by icons shaded a first color, RSOs that have been convicted of a violent crime may be represented by icons shaded a second color, and so on.

The icons 922, 924, and/or 926 may be selectable. For example, a user may select icon 922, 924, and/or 926 to view additional information about the RSO represented by the respective icon 922, 924, and/or 926. As illustrated in FIG. 9, a user has selected the icon 926. As a result of the selection of the icon 926, the user interface 900 may be updated to reveal a window 940. The window 940 may include various RSO data, such as a name (e.g., "RSO #1"), a date of birth, an address, a race, an offense committed by the RSO, a gender, one or more images of the RSO (e.g., image 942 and 944), and so on. In some embodiments, selection of a different icon 922 or 924 may cause the window 940 to disappear and a new window adjacent to the newly selected icon 922 or 924 to appear. In other embodiments, selection of a different icon 922 or 924 may cause a second window adjacent to the newly selection icon 922 or 924 to appear such that the window 940 and the second window are simultaneously displayed in the user interface 900. Thus, a user may be able to view RSO data for multiple RSOs at the same time without having to navigate to different windows or content pages.

As described herein, the map 915 may depict an area that falls within a single state or territory or an area that falls within multiple states or territories. Thus, the map 915 may depict, entirely within a single user interface 900, RSO data for RSOs residing in different states or territories. Thus, a user may be able to view RSO data for multiple RSOs that originated from different state or territory databases at the same time without having to navigate to different windows or content pages.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a processed data store configured to store data records corresponding to a plurality of registered sex offenders; and
a computing system comprising a processor and computer-executable instructions, wherein the computer-executable instructions, when executed, cause the computing system to:
obtain first content page source code from a first external data source;
generate a first document object model (DOM) tree using the first content page source code, wherein the DOM tree comprises a first path corresponding to a first registered sex offender and a second path corresponding to a second registered sex offender;
request second content page source code of a content page corresponding to the first registered sex offender;
obtain the second content page source code;
modify the first path of the DOM tree to include a pointer;
scrape the second content page source code to identify first data corresponding to the first registered sex offender;
request third content page source code of a content page corresponding to the second registered sex offender;
pause, at a first time, a scraping process in response to the third content page source code not being obtained;
using the pointer included in the first path of the DOM tree, determine that the second content page source code corresponding to the first registered sex offender has been obtained and request the third content page source code corresponding to the second registered sex offender at a second time after the first time; and
resume the scraping process.

2. The system of claim 1, wherein the computer-executable instructions, when executed, further cause the computing system to:
ping a server hosting the content page;
determine that the server is operational in response to the ping; and
resume the scraping process in response to the determination that the server is operational.

3. The system of claim 2, wherein the second time occurs after the server is operational.

4. The system of claim 1, wherein the computer-executable instructions, when executed, further cause the computing system to:
scrape the third content page source code to identify second data corresponding to the second registered sex offender; and
modify the second path of the DOM tree to include the pointer.

5. The system of claim 1, wherein the third content page source code is not obtained because a server hosting the content page has failed.

6. The system of claim 1, wherein the pointer being included in the first path of the DOM tree indicates that the second content page source code associated with the first registered sex offender has been scraped.

7. The system of claim 1, wherein the computer-executable instructions, when executed, further cause the computing system to:
parse the DOM tree to identify that the pointer is included in the first path of the DOM tree; and
request the third content page source code corresponding to the second registered sex offender in response to a determination that the pointer is located in a portion of the DOM tree corresponding to the first registered sex offender.

8. The system of claim 1, wherein the first path and the second path are different paths.

9. The system of claim 1, wherein the first data comprises a first name, a middle initial, and a last name.

10. A computer-implemented method comprising:
obtaining first content page source code from a first external data source;
generating a first document object model (DOM) tree using the first content page source code, wherein the DOM tree comprises a first path corresponding to a first registered sex offender and a second path corresponding to a second registered sex offender;

requesting second content page source code of a content page corresponding to the first registered sex offender;
obtaining the second content page source code;
modifying the first path of the DOM tree to include a pointer;
scraping the second content page source code to identify first data corresponding to the first registered sex offender;
requesting third content page source code of a content page corresponding to the second registered sex offender;
pausing, at a first time, a scraping process in response to the third content page source code not being obtained;
using the pointer included in the first path of the DOM tree, determining that the second content page source code corresponding to the first registered sex offender has been obtained and requesting the third content page source code corresponding to the second registered sex offender at a second time after the first time; and
resuming the scraping process.

11. The computer-implemented method of claim 10, wherein resuming the scraping process further comprises:
pinging a server hosting the content page;
determining that the server is operational in response to the ping; and
resuming the scraping process in response to the determination that the server is operational.

12. The computer-implemented method of claim 11, wherein the second time occurs after the server is operational.

13. The computer-implemented method of claim 10, further comprising:
scraping the third content page source code to identify second data corresponding to the second registered sex offender; and
modifying the second path of the DOM tree to include the pointer.

14. The computer-implemented method of claim 10, wherein the third content page source code is not obtained because a server hosting the content page has failed.

15. The computer-implemented method of claim 10, wherein the pointer being included in the first path of the DOM tree indicates that the second content page source code associated with the first registered sex offender has been scraped.

16. The computer-implemented method of claim 10, wherein requesting the third content page source code further comprises:
parsing the DOM tree to identify that the pointer is included in the first path of the DOM tree; and
requesting the third content page source code corresponding to the second registered sex offender in response to a determination that the pointer is located in a portion of the DOM tree corresponding to the first registered sex offender.

17. The computer-implemented method of claim 10, wherein the first path and the second path are different paths.

18. The computer-implemented method of claim 10, wherein the first data comprises a first name, a middle initial, and a last name.

19. Non-transitory, computer-readable storage media comprising computer-executable instructions for obtaining registered sex offender data, wherein the computer-executable instructions, when executed by a computer system, cause the computer system to:
obtain first content page source code from a first external data source;
generate a first document object model (DOM) tree using the first content page source code, wherein the DOM tree comprises a first path corresponding to a first registered sex offender and a second path corresponding to a second registered sex offender;
request second content page source code of a content page corresponding to the first registered sex offender;
obtain the second content page source code;
modify the first path of the DOM tree to include a pointer;
scrape the second content page source code to identify first data corresponding to the first registered sex offender;
request third content page source code of a content page corresponding to the second registered sex offender;
pause, at a first time, a scraping process in response to the third content page source code not being obtained;
using the pointer included in the first path of the DOM tree, determine that the second content page source code corresponding to the first registered sex offender has been obtained and request the third content page source code corresponding to the second registered sex offender at a second time after the first time; and
resume the scraping process.

20. The non-transitory, computer-readable storage media of claim 19, wherein the computer-executable instructions, when executed, further cause the computer system to:
ping a server hosting the content page;
determine that the server is operational in response to the ping; and
resume the scraping process in response to the determination that the server is operational.

* * * * *